United States Patent
Go et al.

(10) Patent No.: US 6,990,580 B2
(45) Date of Patent: Jan. 24, 2006

(54) INFORMATION PROVIDING APPARATUS AND METHOD, INFORMATION PROCESSING APPARATUS AND METHOD, AND PROGRAM STORAGE MEDIUM

(75) Inventors: Naomi Go, Kanagawa (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 708 days.

(21) Appl. No.: 09/802,133

(22) Filed: Mar. 9, 2001

(65) Prior Publication Data
US 2002/0029199 A1 Mar. 7, 2002

(30) Foreign Application Priority Data
Mar. 14, 2000 (JP) ........................... 2000-070461

(51) Int. Cl.
*H04L 9/00* (2006.01)

(52) U.S. Cl. ........................ 713/168; 380/277
(58) Field of Classification Search ............. 380/277, 380/278; 713/168–171, 189, 193–194, 200–201; 705/56–59
See application file for complete search history.

(56) References Cited
U.S. PATENT DOCUMENTS

| 5,727,159 A | 3/1998 | Kikinis |
| 6,002,772 A | 12/1999 | Saito |
| 6,058,476 A * | 5/2000 | Matsuzaki et al. .......... 713/169 |
| 6,578,149 B1 * | 6/2003 | Kawamae et al. .......... 713/200 |

FOREIGN PATENT DOCUMENTS

| WO | WO 98/43177 | 10/1998 |
| WO | WO 00/11871 | 3/2000 |

OTHER PUBLICATIONS

Eberhard von Faber, et al., "The Secure Distribution of Digital Contents", IEEE Proceedings. Annual Computer Security Applications Conference, XP–002141599, Dec. 8, 1997, pp. 16–22.

* cited by examiner

*Primary Examiner*—Hosuk Song
(74) *Attorney, Agent, or Firm*—Oblon, Spivak, McClelland, Maier & Neustadt, P.C.

(57) ABSTRACT

Contents and its key are supplied in different procedures. License management program authenticates telephone-integrated terminal device and authenticates first server or second server. Server LCM controls the reception of contents and key transmission requests and of data for identifying first server or second server. If data for identifying first server are received, contents and its key are received from first server in a procedure corresponding to first server. If data for identifying second server are received, contents and its key are received from second server in a procedure corresponding to second server. Server LCM controls the transmission of contents and its key to telephone-integrated terminal device.

18 Claims, 17 Drawing Sheets

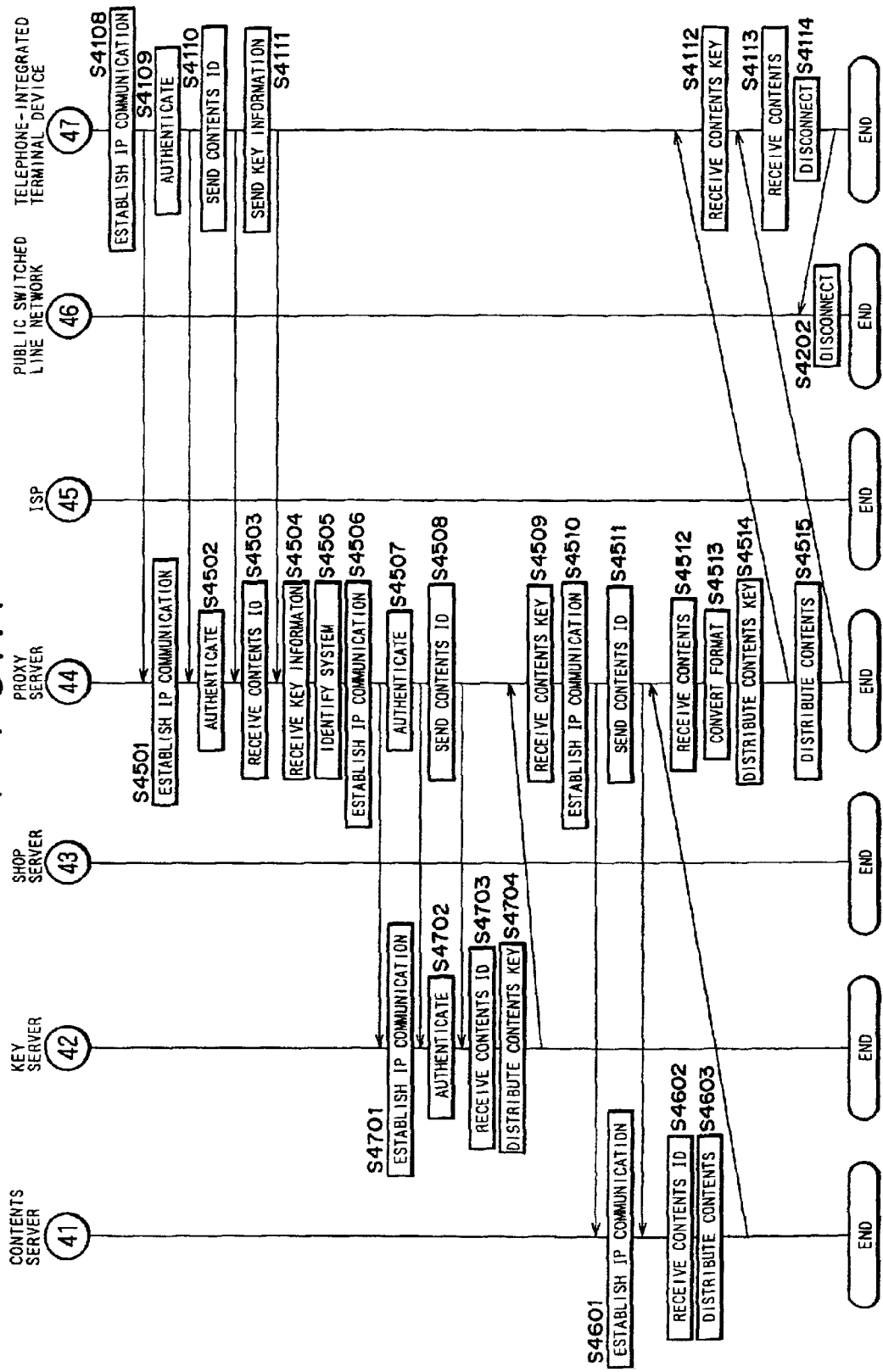
F I G. 17

INFORMATION PROVIDING APPARATUS AND METHOD, INFORMATION PROCESSING APPARATUS AND METHOD, AND PROGRAM STORAGE MEDIUM

BACKGROUND OF THE INVENTION

The present invention relates generally to an information providing apparatus and method, an information processing apparatus and method, and a program storage medium. More particularly, the present invention relates to an information providing apparatus and method, an information processing apparatus and method, and a program storage medium that provide contents and a key for decrypting it or use encrypted contents.

Referring to FIG. 1, there is shown a schematic diagram illustrating one configuration of a prior-art digital data transmission system. A personal computer 1 is connected to a communication network 4 constituted by a local area network or the Internet for example. The personal computer 1 receives music data (hereafter referred to as contents) from a contents server 22-1 or 22-2 or read from a CD (Compact Disk), compresses the received data by a predetermined compression scheme (for example, ATRAC3 (trademark)), encrypts them by a predetermined encryption algorithm such as DES (Data Encryption Standard), and records the resultant contents.

The personal computer 1 also records usage condition data indicative of the usage conditions of the recorded encrypted contents.

The usage condition data indicate the number of portable devices (also referred to as PDs) which can simultaneously use the contents compliant with the usage conditions (namely, the number of PDs that can checkout the contents, which will be described later), for example. When a piece of contents has been checked out by the number of times specified by the usage conditions, the personal computer 1 can reproduce this contents.

A display operation instructing program 11 of the personal computer 1 displays the data (for example, music title or usage conditions) associated with the contents recorded in the personal computer 1 and inputs a checkout instruction for example to make an LCM (Licensed Compliant Module) 12, a software module compliant with the SDMI (Secure Digital Music Initiative) standard, execute a checkout operation for example corresponding to the instruction.

The LCM 12 of the personal computer 1 is constituted by a group of modules which control the use of contents only when the usage conditions specified by the copyright holder of individual contents are satisfied, thereby preventing the copyright infringement based on noncompliant secondary use of the contents. The usage conditions include reproduction condition of the contents, copy condition, move condition, and accumulation condition.

The LCM 12 makes an authentication whether the devices connected to the personal computer 1 are compliant ones and executes the processing such as a movement of contents by a safe method. Along with this processing, the LCM generates a necessary key, manages the generated key, and encrypts the contents with this key, or controls the communication with the connected devices.

The LCM 12 also checks a loaded portable medium 3 for its validity, adds the usage conditions specified by a server 5 to the contents (encrypted), and stores the contents in the portable medium 3.

The LCM 12 of the personal computer 1 supplies the stored encrypted contents along with the data (for example, music title or usage conditions) associated with the contents to the a connected portable device 2 and accordingly updates the usage conditions (this update operation is hereafter referred to as a checkout). To be more specific, when a checkout is made, the permitted checkout count for the usage conditions for this contents is decremented by 1, the permitted checkout count being stored in the personal computer 1. When the checkout count is 0, the relevant contents cannot be checked out.

The portable device 2 stores in the loaded portable medium 3 the contents supplied from the personal computer 1 (namely, the checked out contents) along with the data (for example, a music title or usage conditions) associated with that contents.

The portable medium 3, incorporating a storage medium such as a flash memory, is constructed so as to detachably fit the portable device 2.

The portable device 2 reproduces the contents stored in the portable medium 3 on the basis of its usage conditions and outputs a reproduced signal to a headphone for example, not shown.

For example, if the user attempts the reproduction of a certain piece of contents stored in the portable device 2 in excess of a reproduction count set as a reproduction limit, the portable device 2 fails the attempt.

The user can remove the portable device 2 storing contents from the personal computer 1 to carry it about and reproduce the contents stored in the portable medium 3 to listen to the reproduced music for example by means of a headphone for example.

When the portable device 2 is connected to the personal computer 1 via a USB cable for example, the portable device 2 and the personal computer 1 cross-authenticate each other. This cross-authentication is based on a challenge-response scheme. In the challenge-response scheme, to a certain value (or a challenge) generated by the personal computer 1, the portable device 2 makes a response with a value (or a response) generated by use of a secret key shared by the personal computer 1.

A server 5-1 accumulates contents compressed and encrypted in predetermined algorithms and distributes the accumulated contents on demand from the personal computer 1. The server 5-1 has the capabilities of a key server 21-1, a contents server 22-1, and shop server 23-1.

The key server 21-1 accumulates contents keys for decrypting the contents supplied from the contents server 22-1 to the personal computer 1 and, in response to a request from the personal computer 1, supplies a relevant contents key to the personal computer 1. Before a contents key supply operation starts, the key server 21-1 and the personal computer 1 cross-authenticate each other. The key server 21-1 encrypts the contents key with a temporary key generated by the cross-authentication and sends the encrypted contents key to the personal computer 1. The personal computer 1 decrypts the received contents key with the shared temporary key.

Requested by the personal computer 1, the contents server 22-1 supplies the requested contents (encrypted) and its usage conditions to the personal computer 1 via a communication network 4.

The shop server 23-1 provides the digital data (including a contents list of music titles and prices for example) associated with the contents to be provided by the contents server 22-1 to the personal computer 1 and, in response to a contents purchase request from the personal computer 1, supplies the URL (Uniform Resource Locator) of the contents server 22-1 that supplies the requested contents and the URL of the key server 21-1 that supplies a contents key for decrypting the supplied contents to the personal computer 1.

A server 5-2 accumulates contents compressed and encrypted in predetermined algorithms and distributes the accumulated contents on demand from the personal computer 1. The server 5-2 has the capabilities of a key server 21-2, a contents server 22-2, and shop server 23-2.

The key server 21-2 accumulates contents keys for decrypting the contents supplied from the contents server 22-2 to the personal computer 1 and, in response to a request from the personal computer 1, supplies a relevant contents key to the personal computer 1. Before a contents key supply operation starts, the key server 21-2 and the personal computer 1 cross-authenticate each other. The key server 21-2 encrypts the contents key with a temporary key generated by the cross-authentication and sends the encrypted contents key to the personal computer 1. The personal computer 1 decrypts the received contents key with the shared temporary key.

Requested by the personal computer 1, the contents server 22-2 supplies the requested contents (encrypted) and its usage conditions to the personal computer 1 via a communication network 4.

The shop server 23-2 provides the digital data (including a contents list of music titles and prices for example) associated with the contents to be provided by the contents server 22-2 to the personal computer 1 and, in response to a contents purchase request from the personal computer 1, supplies the URL of the contents server 22-2 that supplies the requested contents and the URL of the key server 21-2 that supplies a contents key for decrypting the supplied contents to the personal computer 1.

Hereafter, if there is no need for making a distinction between the server 5-1 and the server 5-2, they are generically referred to as a server 5. Likewise, the key server 21-1 and the key server 21-2 are generically referred to as a key server 21. The contents server 22-1 and the contents server 22-2 are generically referred to as a contents server 22. The shop server 23-1 and the shop server 23-2 are generically referred to as a shop server 23.

The following describes a configuration of the capabilities of a prior-art digital data transmission system with reference to FIG. 2. In addition to the display operation instructing program 11 and the LCM 12, the personal computer 1 executes an IP (Internet Protocol) communication program 13, an ISP (Internet Service Provider) connection program 14, and a PHS (Personal Handyphone System)/IMT (International Mobile Telecommunication) communication program 15.

The PHS/IMT communication program 15 is for communication to be executed via a public switched line network 31. The ISP connection program 14 is for connection to an ISP 32. The IP communication program 13 includes protocols such as HTTP (HyperText Transport Protocol) 74 and WAP (Wireless Access Protocol) 75 and makes communication with the key server 21, the contents server 22, or the shop server 23 via the communication network 4.

The LCM 12 consists of a license management program 51, a download program 52-1, a download program 52-2, and a format management program 53.

The license management program 51 is for managing the usage of contents under the usage conditions of the contents and consists of a usage condition management program 61, a CD ripping program 62, and a PD authentication program 63.

The usage condition management program 61 controls, on the basis of the usage conditions of contents, the permission or prohibition of the checkout of the contents stored in the personal computer 1 and updates the usage condition data as the contents is checked out. The CD ripping program 62 reads contents from a CD loaded in the personal computer 1 and generates the usage conditions relevant to the read contents.

The PD authentication program 63 authenticates the portable device 2 loaded in the personal computer 1.

The download program 52-1 downloads contents and its contents key from the server 5-1 and consists of a key management program 64, a contents management program 65, a key information receiving program 66, and a contents information receiving program 67.

The key management program 64 authenticates the key server 21-1 and receives a contents key from the key server 21-1 to manage the received contents key in association with the contents. The key management program 64 consists of a server authentication program 71 and a receiving program 72.

The server authentication program 71 authenticates the key server 21-1 as will be described. The receiving program 72 receives a contents key from the key server 21-1 via the communication network 4.

The contents management program 65 receives contents and its usage condition data from the contents server 22-1 via the communication network 4 and record the received contents and its usage condition data. A receiving program 73 of the contents management program 65 receives the contents and its usage condition data from the contents server 22-1.

The key information receiving program 66 receives the URL of the key server 21-1 which supplies a contents key relevant to a desired piece of contents from the shop server 23-1. The contents information receiving program 67 receives, from the shop server 23-1, the contents ID for the contents requested by the user and the URL for identifying the contents server 22-1 that supplies the requested contents.

The download program 52-2 downloads contents and its contents key from the server 5-2 and is the same in configuration as the download program 52-1, its description being skipped.

The format management program 53 converts the coding algorithm and encryption algorithm of the contents downloaded from the contents server 22-1 or 22-2 into predetermined algorithms and encrypts the contents read from a CD by a predetermined algorithm. The format management program 53 consists of a system identification program 68 and a format conversion program 69.

The system identification program 68 identifies whether contents is downloaded from the server 5-1 or the server 5-2. The format conversion program 69 converts the encoding algorithm and encryption algorithm of the contents.

The portable device 2 executes a license management program 81, a key management program 82, and a contents management program 83.

The license management program 81 consists of a usage condition management program 91 for managing contents reproduction count on the basis of the usage conditions of the contents, a PC authentication program 92 for authenticating the personal computer 1, and a PM authentication program 93 for authenticating the portable medium 3.

The key management program 82 encrypts the contents key supplied from the personal computer 1 with a storage key stored in the portable medium 3 in advance and manages the encrypted contents key as stored in the portable medium 3.

The contents management program 83 manages the contents sent from the personal computer 1 as stored in the portable medium 3.

The portable medium 3 executes a license management program 101, a key management program 102, and a contents management program 103.

The license management program 101 has a PD authentication program 111 for authenticating the portable device 2 and stores the usage condition data of the contents, controlling the reading for example of the contents on the basis of the usage condition data. The key management program 102 encrypts the contents key supplied from the portable device 2 with the storage key stored in advance to manage the encrypted contents key. The contents management program 103 stores the contents supplied from the portable device 2 to manage the supplied contents.

The shop server 23-1 executes a key information sending program 121, a contents information sending program 122, a contents-access program 123, and an IP communication program 124.

The key information sending program 121 sends the URL of the key server 21-1 that supplies the contents key relevant to the contents requested by the user of the personal computer 1 to the personal computer 1 via the communication network 4.

The contents information sending program 122 sends the URL of the contents server 22-1 that supplies the contents requested by the user of the personal computer 1 to the personal computer 1 via the communication network 4.

The browsing program 123 consists of a viewing program 131 by which the user of the personal computer 1 can view and listen to the contents and a search program 132 by which the user of the personal computer 1 can search for desired pieces of contents.

The IP communication program 124 includes protocols such as HTTP 133 and WAP 134 for example and communicates with the personal computer 1 via the communication network 4.

The key server 21-1 executes an authentication program 151, a key distribution program 152, a key storage program 153, a key generation program 154, and an IP communication program 155.

The authentication program 151 authenticates the personal computer 1 for example. The key distribution program 152 distributes contents keys stored in the key storage program 153 to the authenticated personal computer 1. The key storage program 153 stores contents keys generated by the key generation program 154. The key generation program 154 generates contents keys in association with particular pieces of contents.

The IP communication program 155 includes protocols such as HTTP 171 and WAP 172 to communicate with the personal computer 1 for example via the communication network 4.

The contents server 22-1 executes a contents storage program 191, a contents distribution program 192, and an IP communication program 193.

The contents storage program 191 stores the encrypted contents in association with contents IDs. The contents distribution program 191 distributes, upon request from the personal computer 1, the contents corresponding to the contents ID stored in the contents storage program 191 to the personal computer 1.

The IP communication program 193 includes protocols such as HTTP 201 and WAP 202 to communicate with the personal computer 1 via the communication network 4.

The shop server 23-2 is generally the same in configuration as the shop server 23-1 and therefore its description will be skipped. The key server 21-2 is generally the same in configuration as the key server 211 and therefore its description will be skipped. The contents server 22-2 is generally the same in configuration as the contents server 22-1 and therefore its description will be skipped.

The following describes the prior-art processing in which the personal computer 1 downloads contents from the server 5-1 and checks out the downloaded contents to the portable device 2, with reference to the flowcharts shown in FIGS. 3 and 4. In step S101, the PHS/IMT communication program 15 of the personal computer 1 establishes a connection with the public switched line network 31. In step S201, a ground station for example, not shown, in the public switched line network 31 establishes a connection with the personal computer 1.

In step S102, the ISP connection program 14 of the personal computer 1 establishes a connection with the ISP 32. In step S301, the ISP 32 establishes a connection with the personal computer 1.

In step S103, the IP communication program 13 of the personal computer 1 establishes an IP communication with the shop server 23. In step S401, the IP communication program 124 of the shop server 23-1 establishes an IP communication with the personal computer 1.

In step S402, the contents-access program 123 of the shop server 23-1 sends the digital data for browsing (for contents selection) to the personal computer 1 via the communication network 4. In step S104, a browser program, not shown, of the personal computer 1 displays the image or text corresponding to the received digital data for browsing by the user. The browser program of the personal computer 1 also has capabilities of allowing the user to test-view the downloaded contents in a stream reproduction manner and the contents-access program 123 of the shop server 23-1 to search for a particular piece of contents by keyword to display the search results. The processes of steps S402 and S104 are repeated in accordance with the request by the user of the personal computer 1.

In step S105, the browser program of the personal computer 1 sends a purchase request to the shop server 23-1. In step S403, the contents-access program 123 of the shop server 23-1 receives the purchase request from the personal computer 1.

In step S404, the contents information sending program 122 of the shop server 23-1 sends, to the personal computer 1 via the network 4, the contents information including the URL of the contents server 22-1 that distributes the contents specified in the purchase request received in step S403. In step S106, the contents information receiving program 67 of the personal computer 1 receives the contents information from the shop server 23-1.

In step S405, the key information sending program 121 of the shop server 23-1 sends, to the personal computer 1 via the network 4, the key information such as the URL of the key server 21-1 that distributes the contents key of the contents specified in the purchase request received in step S403. In step S107, the key information receiving program 66 of the personal computer 1 receives the key information from the shop server 23-1.

In step S108, the IP communication program 13 of the personal computer 1 establishes an IP communication with the contents server 22-1 by use of the URL of the contents server 22-1 included in the contents information obtained in step S106. In step S501, the IP communication program 193 of the contents server 22-1 establishes an IP connection with the personal computer 1.

In step S109, the contents management program 65 of the personal computer 1 sends the contents ID obtained in step 5106 to the contents server 22-1 via the communication network 4. In step S502, the contents server 22-1 receives the contents ID from the personal computer 1. In step S503, the contents distribution program 192 of the contents server 22-1 reads the contents (encrypted) corresponding to the contents ID received in step S502 from the contents storage program 191 and distributes the contents to the personal computer 1 via the communication network 4. In step S110, the receiving program 73 of the contents management program 65 of the personal computer 1 receives the contents from the contents server 22-1.

In step S111, the IP communication program 13 of the personal computer 1 establishes an IP communication with the key server 21-1 on the basis of the URL of the key server 21-1 contained in the key information obtained in step S107. In step S601, the IP communication program 155 of the key server 21-1 establishes an IP communication with the personal computer 1.

In step S112, the server authentication program 71 of the key management program 64 of the personal computer 1 authenticates the key server 21-1. In step S602, the authentication program 151 of the key server 21-1 authenticates the personal computer 1.

The key server 21-1 stores a master key KMS in advance and the personal computer 1 stores a private key KPP and the ID of the personal computer 1 in advance. The personal computer also stores a master key KMP in advance and the key server 21-1 also stores its ID and private key KPS in advance.

The key server 21-1 receives the ID of the personal computer 1 from the personal computer 1 and applies a hash function to the received ID and the master key KMS of the key server 21-1 to generate a same key as the private key KPP of the personal computer 1.

The personal computer 1 receives the ID of the key server 21-1 from the key server 21-1 and applies a hash function to the received ID and the master key KMP of the personal computer 1 to generate a same key as the private key KPS of the key server 21-1. Consequently, the common private key is shared between the personal computer 1 and the key server 21-1. By use of these private keys, a temporary key is generated.

In step S113, the key management program 64 of the personal computer 1 sends a contents ID to the key server 21-1. In step S603, the key server 21-1 receives the contents ID from the personal computer 1. In step S604, the key distribution program 152 of the key server 21-1 reads the contents key stored in the key storage program 153 in association with the contents ID and sends this contents key (encrypted by the temporary key) to the personal computer 1. In step S114, the receiving program 72 of the key management program 64 of the personal computer 1 receives the contents key from the key server 21-1. The key management program 64 decrypts the received contents key with the temporary key.

In step S115, the PHS/IMT communication program 15 of the personal computer 1 disconnects the communication with the public switched line network 31. In step S202, the ground station, not shown, of the public switched line network 31 disconnects the communication with the personal computer 1.

In step S116, the format management program 53 converts the coding algorithm and encryption algorithm of the contents received in step S110 into predetermined algorithms.

When the user of the personal computer 1 instructs the display operation instructing program 11 to check out the received contents, the processes of steps S117 and the subsequent processes are executed.

In step S117, the PD authentication program 63 of the license management program 51 of the personal computer 1 authenticates the portable device 2. In step S701, the PC authentication program 92 of the license management program 81 of the portable device 2 authenticates the personal computer 1.

The cross-authentication processes between the personal computer 1 and the portable device 2 in step S117 and step S701 is based on a challenge-response scheme. As compared with the cross-authentication between the key server 21-1 and the personal computer 1 in step S112 and step S602, the challenge response scheme needs less computational load. The personal computer 1 and the portable device 2 each generate a temporary key from the response by a same computational operation and share the generated temporary key.

In step S118, the contents management program 65 of the personal computer 1 distributes the encrypted contents to the portable device 2. In step S702, the contents management program 83 of the portable device 2 receives the contents from the personal computer 1 and supplies the received contents to the contents management program 103 of the portable medium 3. The contents management program 103 of the portable medium 3 stores the received contents.

It should be noted that the portable device 2 and the portable medium 3 cross-authenticate with other when the portable medium 3 is loaded in the portable device 2.

In step S119, the key management program 64 of the personal computer 1 distributes the contents key (encrypted with the temporary key shared between the portable device 2 and the portable medium 3) corresponding to the contents distributed in step S118 to the portable device 2. In step S703, the key management program 82 of the portable device 2 receives the contents key from the personal computer 1 and supplies the received contents key to the key management program 102 of the portable medium 3. The key management program 102 of the portable medium 3 decrypts the received contents key and stores the decrypted contents key.

The following describes the processing in which the personal computer 1 downloads contents from the server 52 and checks out the downloaded contents to the portable device 2, with reference to the flowcharts shown in FIGS. 5 and 6. The processes of steps S1101 through S1107 are executed by the server 5-2, the IP communication program 13, the ISP connection program 14, the PHS/IMT communication program 15, and the download program 52-2 and these processes are generally the same as the processes of steps S101 through S107, so that their descriptions will be skipped.

In step S1108, the IP communication program 13 of the personal computer 1 establishes an IP communication with the key server 21-2 on the basis of the URL of the key server 21-2 contained in the key information obtained in step S1107. In step S1601, the key server 21-2 establishes an IP communication with the personal computer 1.

In step S1109, the download program 52-2 of the personal computer 1 authenticates the key server 21-2. In step S1602, the key server 21-2 authenticates the personal computer 1. The processes of steps S1109 and S1602 are the same as those of steps S112 and S602.

In step S1110, the download program 52-2 of the personal computer 1 sends a contents ID to the key server 21-2. In step S1603, the key server 21-2 receives the contents ID from the personal computer 1. In step S1604, the key server 21-2 reads the contents key stored in association with the contents ID and sends the contents key (encrypted by the temporary key) to the personal computer 1 via the communication network 4. In step S1111, the download program 52-2 of the personal computer 1 receives the contents key from the key server 21-2. The download program 52-2 decrypts the received contents key with the temporary key.

In step S1112, the IP communication program 13 of the personal computer 1 establishes an IP communication with the contents server 22-2 on the basis of the URL of the contents server 22-2 contained in the contents information obtained in step S1106. In step S1501, the contents server 22-2 establishes an IP communication with the personal computer 1.

In step S1113, the download program 52-2 of the personal computer 1 sends the contents ID obtained in step S1106 to the contents server 22-2 via the communication network 4. In step S1502, the contents server 22-2 receives the contents ID supplied from the personal computer 1. In step S1503, the contents server 22-2 reads the contents (encrypted) corresponding to the contents ID received in step S1502 and distributes the contents to the personal computer 1 via the communication network 4. In step S1114, the download program 52-2 of the personal computer 1 receives the contents distributed from the contents server 22-2.

The processes of steps S1115 through S1703 are the same as those of steps S115 through S703 and therefore their descriptions will be skipped.

As described, the server 5-1 and the server 5-2 that supply contents and contents keys have different procedures for supplying contents and contents keys. Therefore, the reception of contents from the server 5-1 and the server 5-2 requires different download programs 52-1 and 52-2 which correspond to the server 5-1 and the server 5-2 respectively.

SUMMARY OF THE INVENTION

However, if a device that receives contents from these servers is not enough in processing capability, namely, if the device has a low computing power or a small storage capacity, the device cannot store plural download programs and therefore cannot execute them by switching.

It is therefore an object of the present invention to allow devices having only a small processing capability to receive contents and contents keys which are supplied in different procedures.

In carrying out the invention and according to one aspect thereof, there is provided an information providing apparatus comprising: a first authentication means for authenticating a first information processing unit; a second authentication means for authenticating a second information processing unit or a third information processing unit; a reception control means for controlling the reception of a request to send contents and a key and data for identifying the second information processing unit or data for identifying the third information processing unit, the request and the data being supplied from the first information processing unit; a communication control means for controlling, if the data for identifying the second information processing unit are received, the transmission of the request to send the contents and the key to the second information processing unit in a procedure corresponding to the second information processing unit, and, if the contents and the key are received and the data for identifying the third information processing unit are received from the second information processing unit, the transmission of the request to send the contents and the key to the third information processing unit and the reception of the contents and the key from the third information processing unit in a procedure corresponding to the third information processing unit; and a transmission control means for controlling the transmission of the contents and the key to the first information processing unit.

The above-mentioned information providing apparatus further comprising: a conversion means for converting at least one of a encoding scheme and an encryption scheme in which the contents is encoded and encrypted into one of a predetermined encoding scheme and a predetermined encryption scheme.

In the above-mentioned information providing apparatus, the first information processing unit is a portable electronic device for reproducing the contents and the second information processing unit and the third information processing unit are servers each including a contents server and a key server and each having a different procedure in which contents and its key are supplied.

The above-mentioned information providing apparatus further comprising a server licensed compliant module which is constituted as a proxy server.

In carrying out the invention and according to a second aspect thereof, there is provided an information providing method comprising the steps of: authenticating a first information processing unit; authenticating a second information processing unit or a third information processing unit; controlling the reception of a request to send contents and a key and data for identifying the second information processing unit or data for identifying the third information processing unit, the request and the data being supplied from the first information processing unit; controlling, if the data for identifying the second information processing unit are received, the transmission of the request to send the contents and the key to the second information processing unit in a procedure corresponding to the second information processing unit, and, if the contents and the key are received and the data for identifying the third information processing unit are received from the second information processing unit, the transmission of the request to send the contents and the key to the third information processing unit and the reception of the contents and the key from the third information processing unit in a procedure corresponding to the third information processing unit; and controlling the transmission of the contents and the key to the first information processing unit.

The above-mentioned information providing method further comprising the step of: converting at least one of a encoding scheme and an encryption scheme in which the contents is encoded and encrypted into one of a predetermined encoding scheme and a predetermined encryption scheme.

In the above-mentioned information providing method, the first information processing unit is a portable electronic device for reproducing the contents and the second information processing unit and the third information processing unit are servers each including a contents server and a key server and each having a different procedure in which contents and its key are supplied.

In the above-mentioned information providing method, the method is executed by a proxy server including a server licensed compliant module.

In carrying out the invention and according to still another aspect thereof, there is provided a program storage medium storing a computer-readable program comprising the steps of: authenticating a first information processing unit; authenticating a second information processing unit or a third information processing unit; controlling the reception of a request to send contents and a key and data for identifying the second information processing unit or data for identifying the third information processing unit, the request and the data being supplied from the first information processing unit; controlling, if the data for identifying the second information processing unit are received, the transmission of the request to send the contents and the key to the second information processing unit in a procedure corresponding to the second information processing unit, and, if the contents and the key are received and the data for identifying the third information processing unit are received from the second information processing unit, the transmission of the request to send the contents and the key to the third information processing unit and the reception of the contents and the key from the third information processing unit in a procedure corresponding to the third information processing unit; and controlling the transmission of the contents and the key to the first information processing unit.

In carrying out the invention and according to yet another aspect thereof, there is provided an information processing apparatus comprising: an authentication means for authenticating a first information providing unit; a transmission control means for controlling the transmission of any one of a request to send contents and a key to the first information providing unit, data for identifying a second information providing unit for providing the contents and the key, and data for identifying a third information providing unit for providing the contents and the key; and a reception control means for controlling the reception of the contents and the key supplied from the second information providing unit or the third information providing unit to the first information providing unit.

In the above-mentioned information processing apparatus, the first information providing unit is a proxy server having a server licensed compliant module and the second information providing unit and the third information providing unit are servers each including a contents server and a key server and each having a different procedure in which contents and its key are supplied.

In the above-mentioned information processing apparatus, the information processing apparatus is a portable electronic device for reproducing the contents.

The above-mentioned information processing apparatus has a download program capable of downloading contents from any of the second information providing unit and the third information providing unit.

In carrying out the invention and according to a different aspect thereof, there is provided an information processing method comprising the steps of: authenticating a first information providing unit; controlling the transmission of any one of a request to send contents and a key to the first information providing unit, data for identifying a second information providing unit for providing the contents and the key, and data for identifying a third information providing unit for providing the contents and the key; and controlling the reception of the contents and the key supplied from the second information providing unit or the third information providing unit to the first information providing unit.

In the above-mentioned information processing method, the first information providing unit is a proxy server having a server licensed compliant module and the second information providing unit and the third information providing unit are servers each having a contents server and a key server and each having a different procedure in which contents and its key are supplied.

In the above-mentioned information processing method, the method is executed by a portable electronic device for reproducing the contents.

In the above-mentioned information processing method, each of the reception controlling steps is executed by a download program capable of downloading contents from any of the second information providing unit and the third information providing unit.

In carrying out the invention and according to a still different aspect thereof, there is provided a program storage medium storing a computer-readable program comprising: authenticating a first information providing unit; controlling the transmission of any one of a request to send contents and a key to the first information providing unit, data for identifying a second information providing unit for providing the contents and the key, and data for identifying a third information providing unit for providing the contents and the key; and controlling the reception of the contents and the key supplied from the second information providing unit or the third information providing unit to the first information providing unit.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawing, in which:

FIG. 17 is a flowchart describing processing in which telephone-integrated terminal device downloads contents from server.

DETAILED DESCRIPTION OF PREFERRED EMBODIMENTS

This invention will be described in further detail by way of example with reference to the accompanying drawings.

Figure 1:
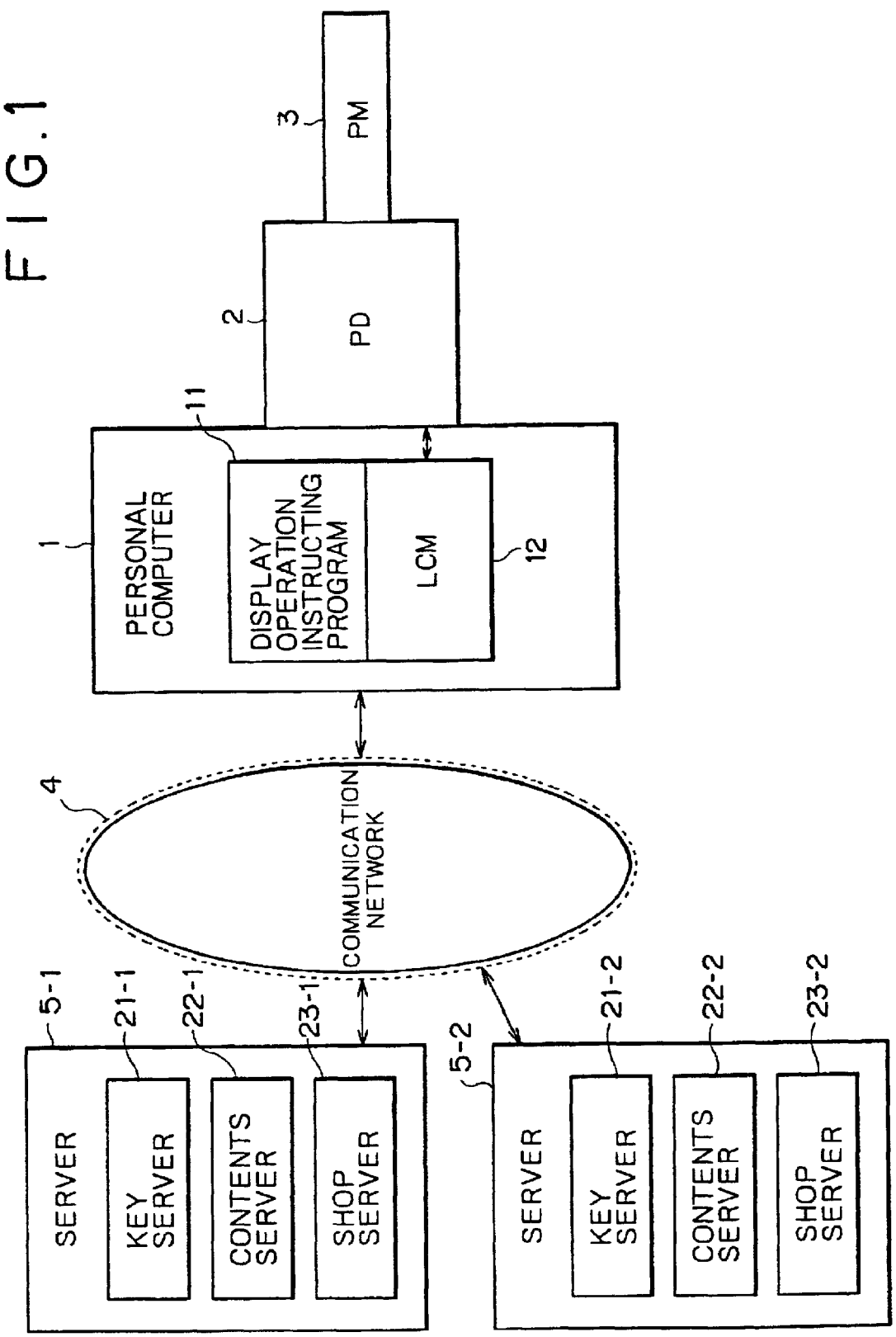
FIG. 1 is a schematic diagram illustrating a configuration of a conventional digital data transmission system.
Figure 7:
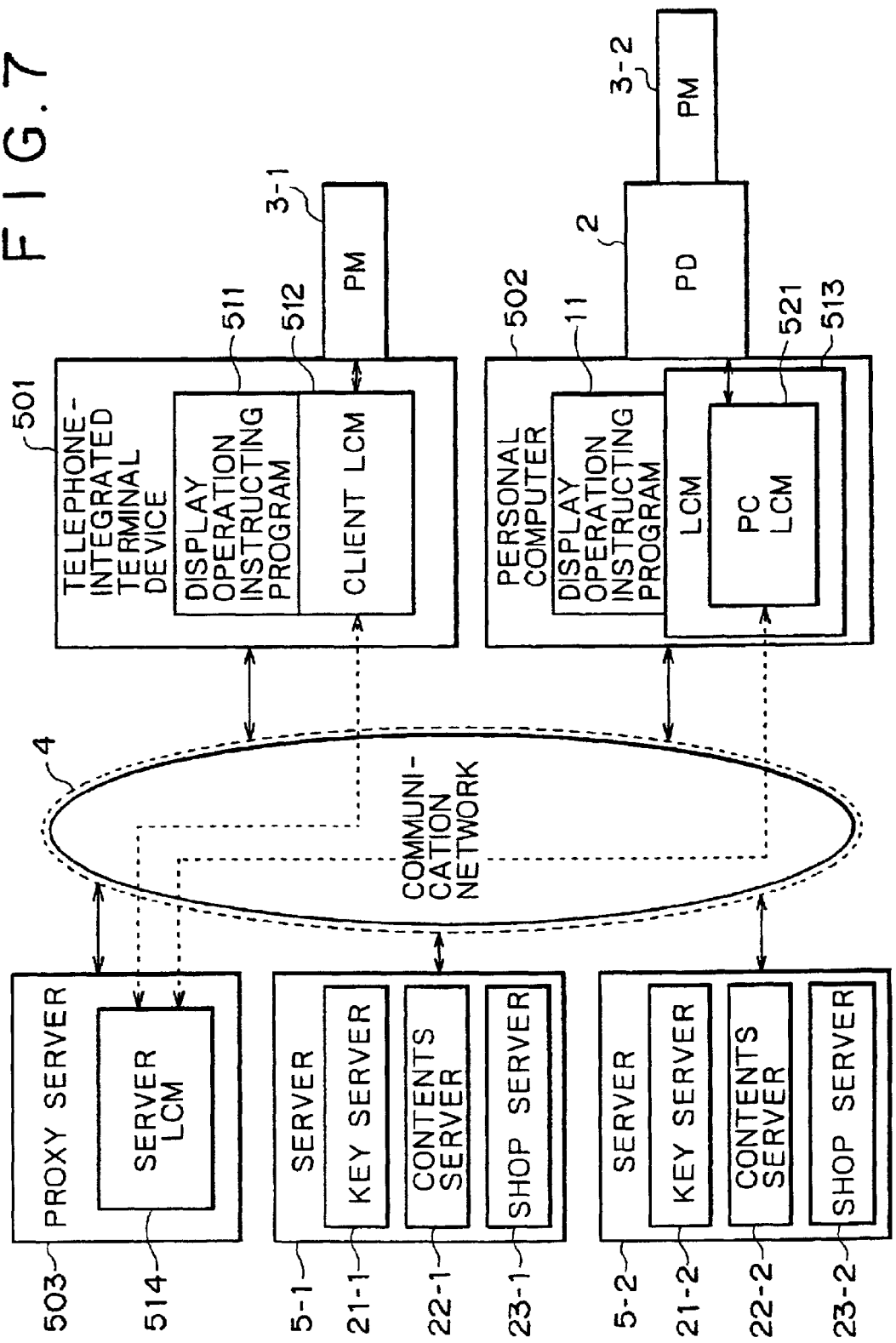
FIG. 7 is a schematic diagram illustrating one embodiment of a digital data transmission system associated with the present invention.

Referring to FIG. 7, there is shown one embodiment of a digital data transmission system associated with the present invention. With reference to FIG. 7, components similar to those previously described with FIG. 1 are denoted by the same reference numerals and their descriptions will be skipped.

A telephone-integrated terminal device 501 is constructed so as to detachably accommodate a portable medium 3-1 and is connected to a communication network 4 in a wireless manner. The telephone-integrated terminal device 501 downloads contents (compressed and encrypted in predetermined schemes) received from a contents server 22-1 or 22-2 via the communication network 4 and stores the downloaded contents into the loaded portable medium 3-1 along with data such as usage conditions of the contents.

On the basis of the usage condition data associated with the contents, the telephone-integrated terminal device 501 reproduces the contents stored in the portable medium 3-1 and outputs the reproduction to a headphone or speaker, not shown. Carrying about the telephone-integrated terminal device 501, its user can download any desired piece of contents at any desired place to store the downloaded contents into the portable medium 3-1. The user makes the telephone-integrated terminal device 501 reproduce the contents stored in the portable medium 3-1 to listen to the music for example pertinent to the contents by means of the headphone for example.

A display operation instructing program 511 of the telephone-integrated terminal device 501 displays the contents-related data (for example, music titles or usage conditions) and, when the user inputs a download instruction, makes a client LCM 512 to execute the corresponding processing. The client LCM 512 of telephone-integrated terminal device 501 executes a sequence of processes (to be described later) for downloading contents and its usage conditions for example, in cooperation with a server LCM 514 of a proxy server 503.

In order to prevent the copyright violation due to noncompliant secondary usage of contents, the client LCM 512 of the telephone-integrated terminal device 501 is constituted by a group of modules which control the use of contents only when the usage conditions specified by the copyright holder of individual contents are satisfied, thereby preventing the copyright infringement based on noncompliant secondary use of the contents. The usage conditions include reproduction condition, copy condition of the contents, move condition, and accumulation condition.

The client LCM 512 makes an authentication whether the portable medium 3-1 loaded in the telephone-integrated terminal device 501 is compliant one and adds the usage condition data specified by the server 5 in a secure manner to the contents (encrypted), storing the contents into the portable medium 3-1. With the movement of contents, the client LCM 512 generates necessary keys, manages them, and controls the communication with the connected portable medium 3-1.

A personal computer 502 is connected to the communication network 4. The personal computer 502 converts the compression scheme and encryption scheme of the contents received from the contents server 22-1 or 22-2 or read from a CD into a predetermined compression scheme and a predetermined encryption scheme such as DES, storing the resulting contents. The personal computer 502 records the data of usage conditions of the encrypted and recorded contents.

The display operation instructing program 11 of the personal computer 502 displays the contents-associated data (for example, music titles or usage conditions) and, when a download instruction or a checkout instruction is inputted by the user, makes an LCM 513 of the personal computer 502 execute a corresponding download operation or checkout operation.

The LCM 513 of the personal computer 502 is constituted by a group of modules which control the use of contents only when the usage conditions specified by the copyright holder of individual contents are satisfied, thereby preventing the copyright infringement based on noncompliant secondary use of the contents. The usage conditions include reproduction condition of the contents, copy condition, move condition, and accumulation condition.

The LCM 513 makes an authentication whether the portable device 2 connected to the personal computer 502 is compliant one and executes a contents movement process for example in a secure manner. With the movement of contents, the LCM 513 generates necessary keys, manages them, and encrypts contents or controls the communication with the connected device.

Also, the LCM 513 checks the validity of the portable device 2. When the portable medium 3-2 is loaded, the portable device 2 checks the validity of the portable medium 3-2. If the portable device 2 and the portable medium 3-2 are found valid, the LCM 513 adds the usage condition data specified by the server 5 to the contents (encrypted) and checks out the resultant contents to the portable medium 3-2. The portable device 2 stores the contents checked out from the personal computer 502 into the loaded portable medium 3-2 along with the contents-associated data.

The LCM 513 of personal computer 502 checks out the encrypted recorded contents to the connected potable device 2. The portable device 2 stores the contents checked out from the personal computer 502 into the loaded portable medium 3-2 along with the contents-associated data.

If the proxy server 503 is available, a PC LCM 521 (constituted by part or all of the functionality of the LCM 513) of the personal computer 502 executes a sequence of processes for downloading contents and its usage conditions in cooperation with the server LCM 514 of the proxy server 503.

If the proxy server 503 is unavailable, the LCM 513 of the personal computer 502 authenticates a key server 21-1 or 21-2 as with the LCM 12 to download contents and its usage conditions.

The proxy server 503 authenticates the key server 21-1 or 21-2 by executing the server LCM 514 in response to a request by the cross-authenticated telephone-integrated terminal device 501 or the cross-authenticated personal computer 502. After the cross-authentication with the key server 21-1 or 21-2, the proxy server 503 receives a contents key from the key server 21-1 or 21-2 and supplies the received contents key to the telephone-integrated terminal device 501 or the personal computer 502. Receiving the contents from the contents server 22-1 or 22-2, the proxy server 503 supplies the received contents to the telephone-integrated terminal device 501 or the personal computer 502.

When downloading contents and its contents key from the server 5-1, the proxy server 503 first receives the contents and then the contents key. When downloading contents and its key from the server 5-2, the proxy server 503 first receives the contents key and then the contents.

The proxy server 503, regardless of whether it has downloaded contents and its contents key from the server 5-1 or the server 5-2, supplies the received contents and contents key to the telephone-integrated terminal device 501 or the personal computer 502 in a same procedure (for example, first transmitting the contents key and then the contents).

Downloading the contents and its contents key from the server 5-1 or the server 5-2 via the proxy server 503, the telephone-integrated terminal device 501 or the personal computer 502 can receive the contents and its contents key in the same procedure.

Figure 8:
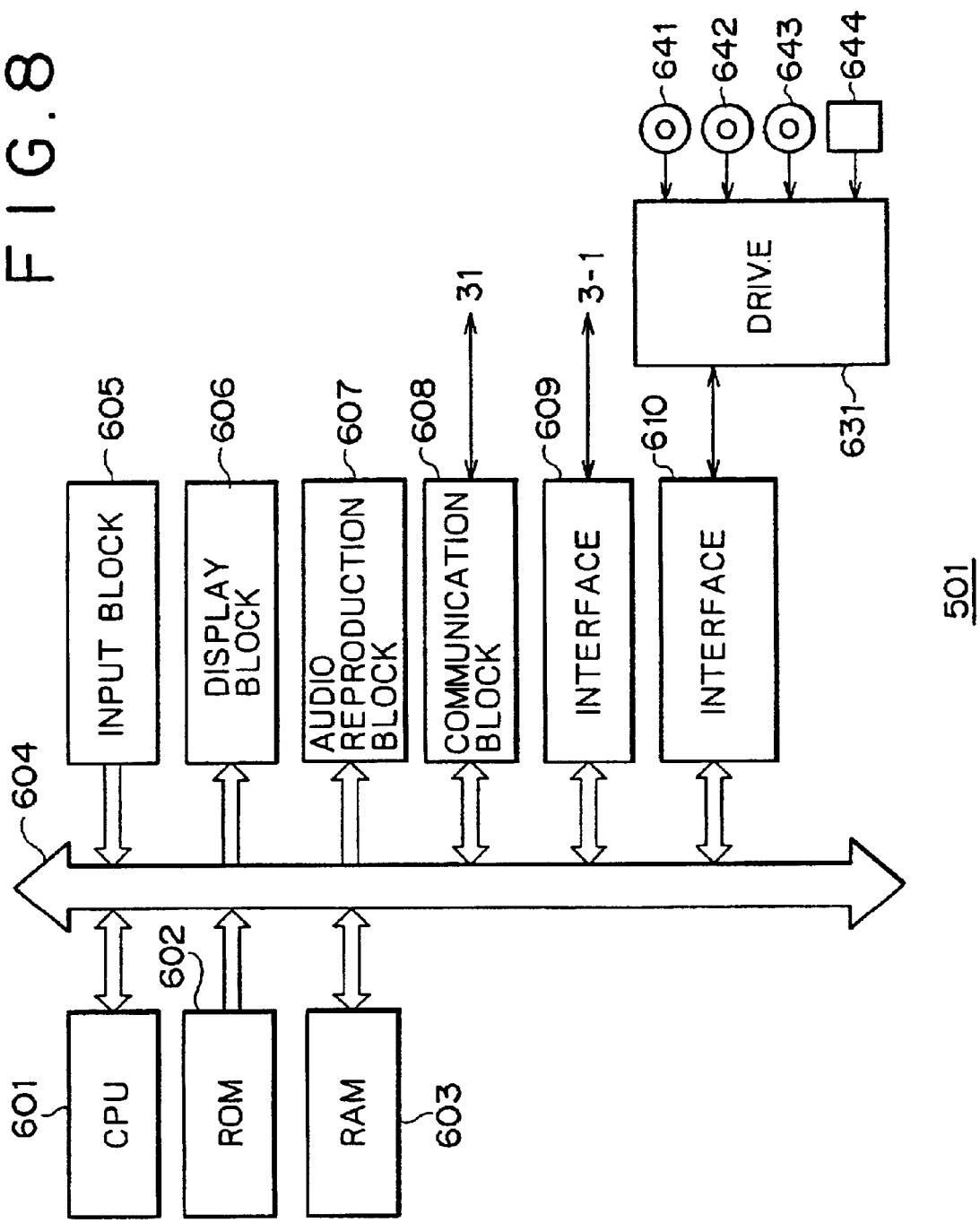
FIG. 8 is a block diagram illustrating a configuration of telephone-integrated terminal device.

FIG. 8 shows a configuration of the telephone-integrated terminal device 501. A CPU (Central Processing Unit) 601 executes programs stored in a ROM (Read Only Memory) 602 or a RAM (Random Access Memory) 603. The ROM 602, constituted by an EEPROM (Electrically Erasable Programmable Read Only Memory) or a flash memory, generally stores programs and basically fixed data of computational parameters to be used by the CPU 601. The RAM 603, constituted by an SRAM (Static Random Access Memory) for example, stores programs to be used by the CPU 601 in its execution and parameters which changes from time to time in the execution.

An input block 605, constituted by an input key or a microphone, is operated by the user when inputting commands into the CPU 601 or inputting a voice. A display block 606, constituted by a liquid crystal display device, displays various kinds of information in the form of text or image.

An audio reproduction block 607 reproduces the voice data of the other party supplied from a communication block 608 or the contents supplied from the portable medium 3-1 via an interface 609 and sounds the reproduced voice signal.

The communication block 608 connects to the public switched line network 31 and stores in predetermined packets the data(for example, a contents send request) supplied from the CPU 601 or the voice data of the user supplied from the input block 605 and sends the packets via the public switched line network 31. Also, the communication block 608 outputs the data(for example, contents) stored in received packets or the voice data of the other party received via the public switched line network 31 to the CPU 601, the RAM 603, the audio reproduction block 607, or the interface 609.

The interface 609 stores the data supplied from the CPU 601, the RAM 603, or the communication block 608 into the portable medium 3-1 and reads data such as contents from the loaded portable medium 3-1 to supply the data to the CPU 601, the RAM 603, or the audio reproduction block 607.

An interface 610 is connected to an externally attached drive 631. The drive 631 reads data or programs from a magnetic disk 641, an optical disk (including a CD-ROM) 642, a magneto-optical disk 643, or a semiconductor memory 644, which is loaded in the drive 631, and supplies these data or programs to the ROM 602 or the RAM 603 via the interface 610 and a bus 604.

The components, the CPU 601 through the interface 610, are interconnected by the bus 604.

Figure 9:
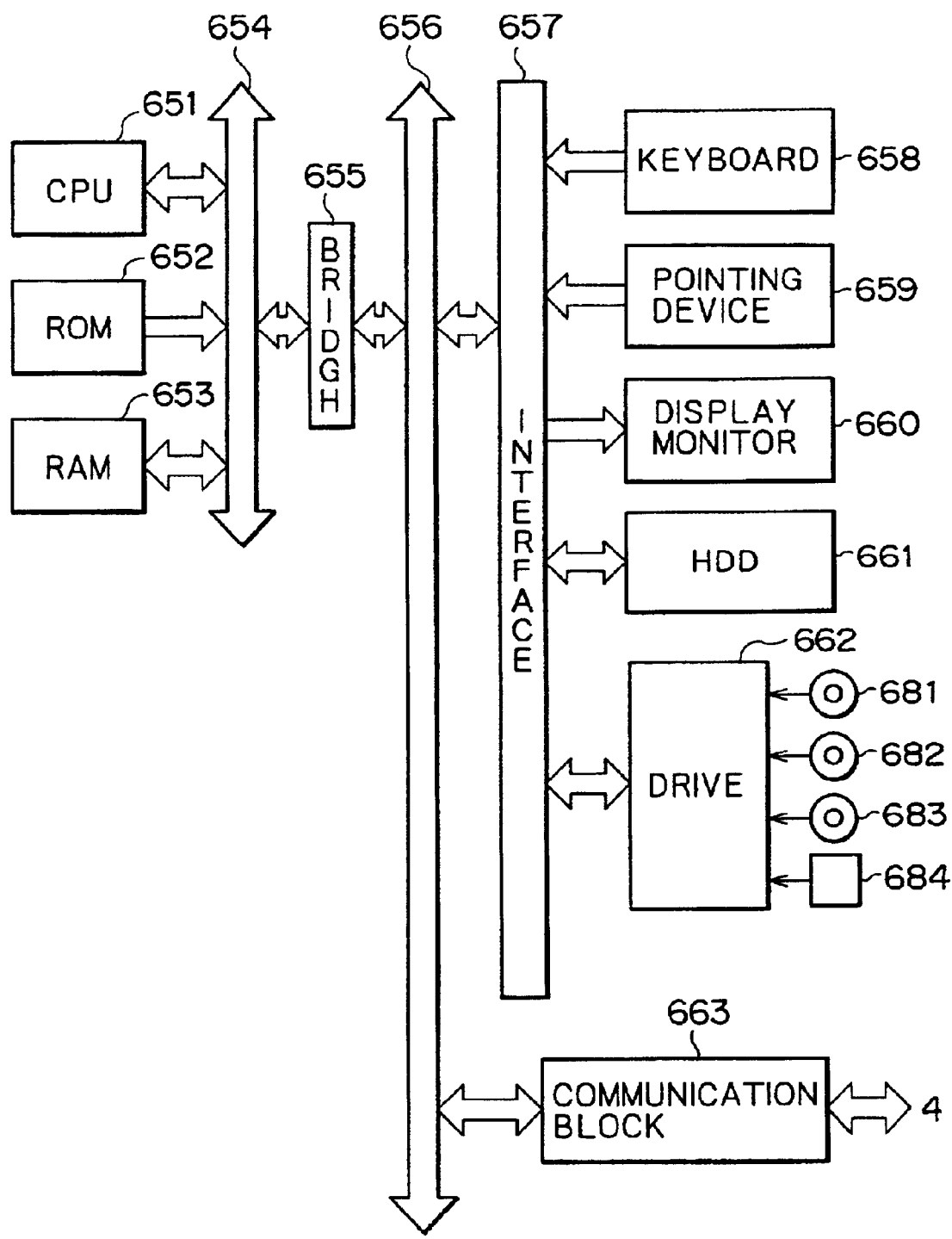
FIG. 9 is a block diagram illustrating a configuration of proxy server.

FIG. 9 shows an internal configuration of the proxy server 503. A CPU 651 executes various application programs (which will be detailed later) and an OS (Operating System). A ROM 652 generally stores programs and basically fixed data of computational parameters to be used by the CPU 651. A RAM 653 stores programs to be used by the CPU 651 in its execution and parameters which changes from time to time in the execution. These are interconnected by a host bus 654 constituted by a CPU bus for example.

The host bus 654 is connected to an external bus 656 such as a PCI (Peripheral Component Interconnect/Interface) bus via a bridge 655.

A keyboard 658 is operated by the user when inputting commands into the CPU 651. A pointing device 659 is operated by the user when indicating a point on a display monitor 660 or selecting items thereon. The display monitor 660, constituted by a liquid crystal display device or a CRT (Cathode Ray Tube), shows various information in text and image. A HDD (Hard Disk Drive) 661 drives a hard disk to record or read programs and information to be used by the CPU 651 to or from the hard disk.

A drive 662 reads data or programs stored on a magnetic disk 681, an optical disk 682, a magneto-optical disk 683, or a semiconductor memory 684, which is loaded in the drive 662, and supplies these data or programs to the RAM 653 via the interface 657, the external bus 656, the bridge 655, and the host bus 654.

These components, the keyboard 658 through the drive 662, are connected to the interface 657 which is connected to the CPU 651 via the external bus 656, the bridge 655, and the host bus 654.

A communication block 663, connected to the communication network 4, stores data (for example, a contents key) supplied from the CPU 651 or the HDD 661 into predetermined packets and send them over the communication network 4 and, at the same time, outputs the data (for example, the contents ID) stored in received packets over the network 4 to the CPU 651, the RAM 653, or the HDD 661.

The communication block 663 is connected to the CPU 651 via the external bus 656, the bridge 655, and the host bus 654.

Figure 2:
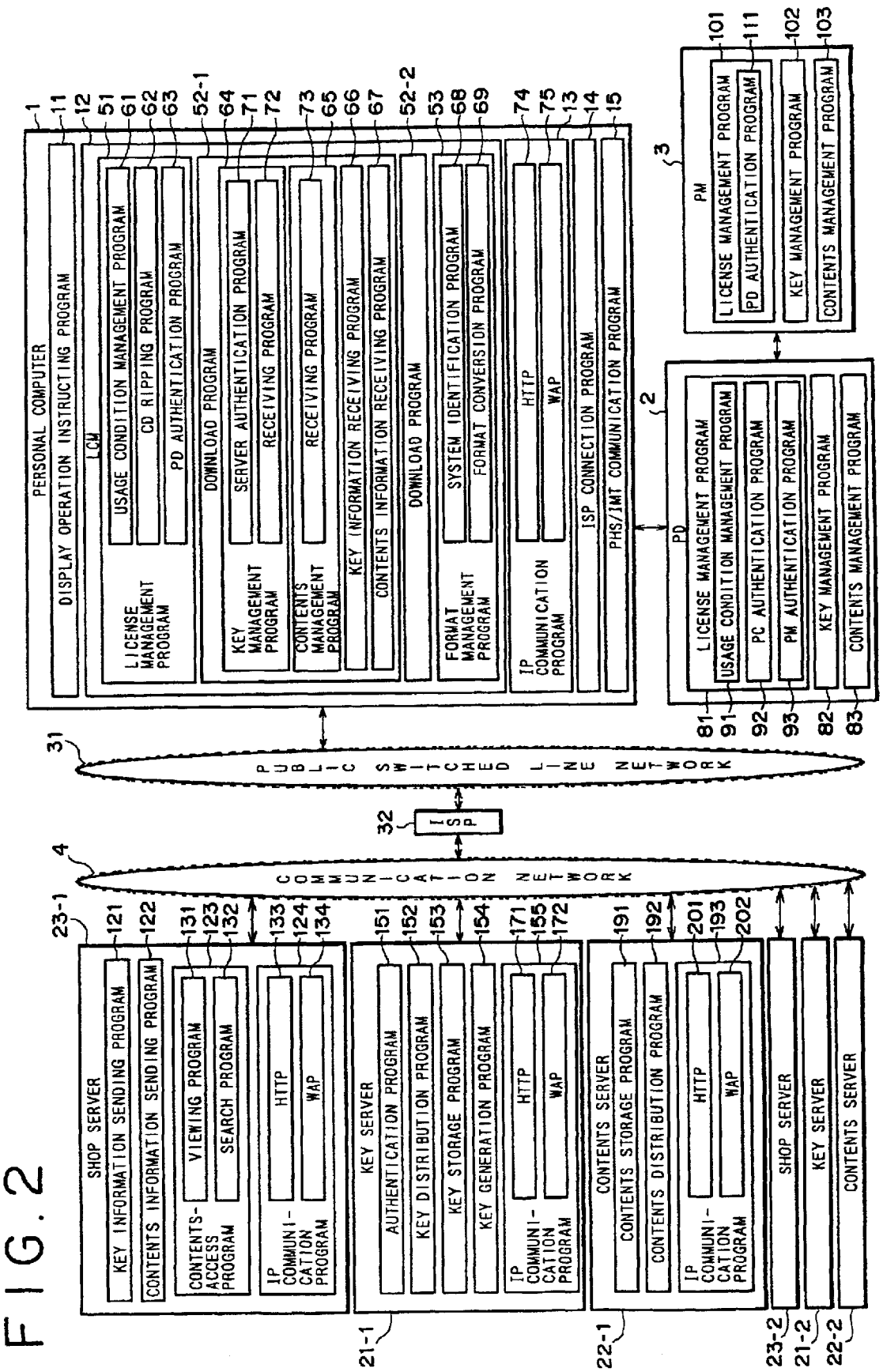
FIG. 2 is a schematic diagram illustrating a functional configuration of the conventional digital data transmission system.
Figure 3:
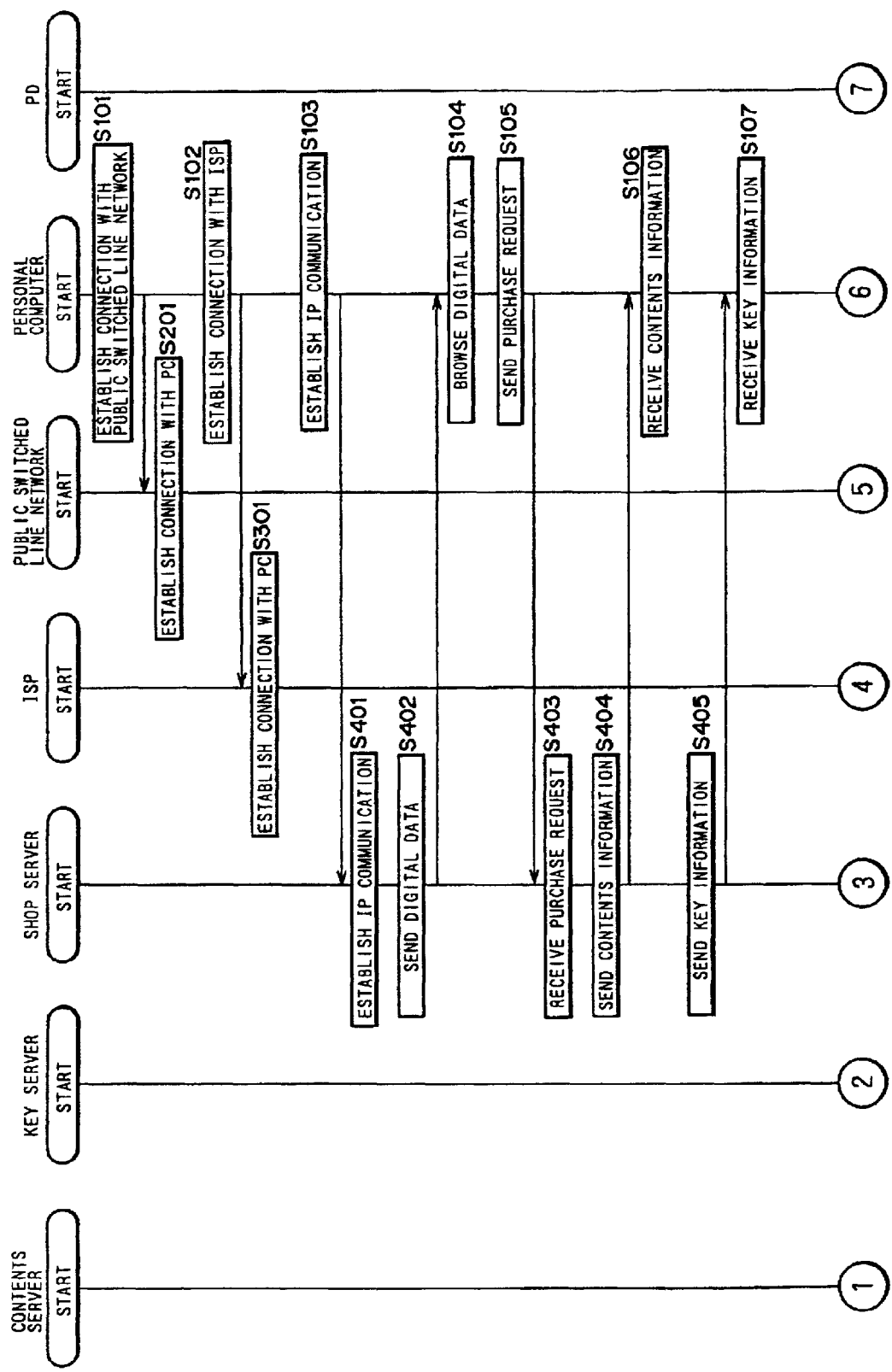
FIG. 3 is a flowchart describing conventional processing in which personal computer downloads contents from server and checks out the downloaded contents to portable device.
Figure 4:
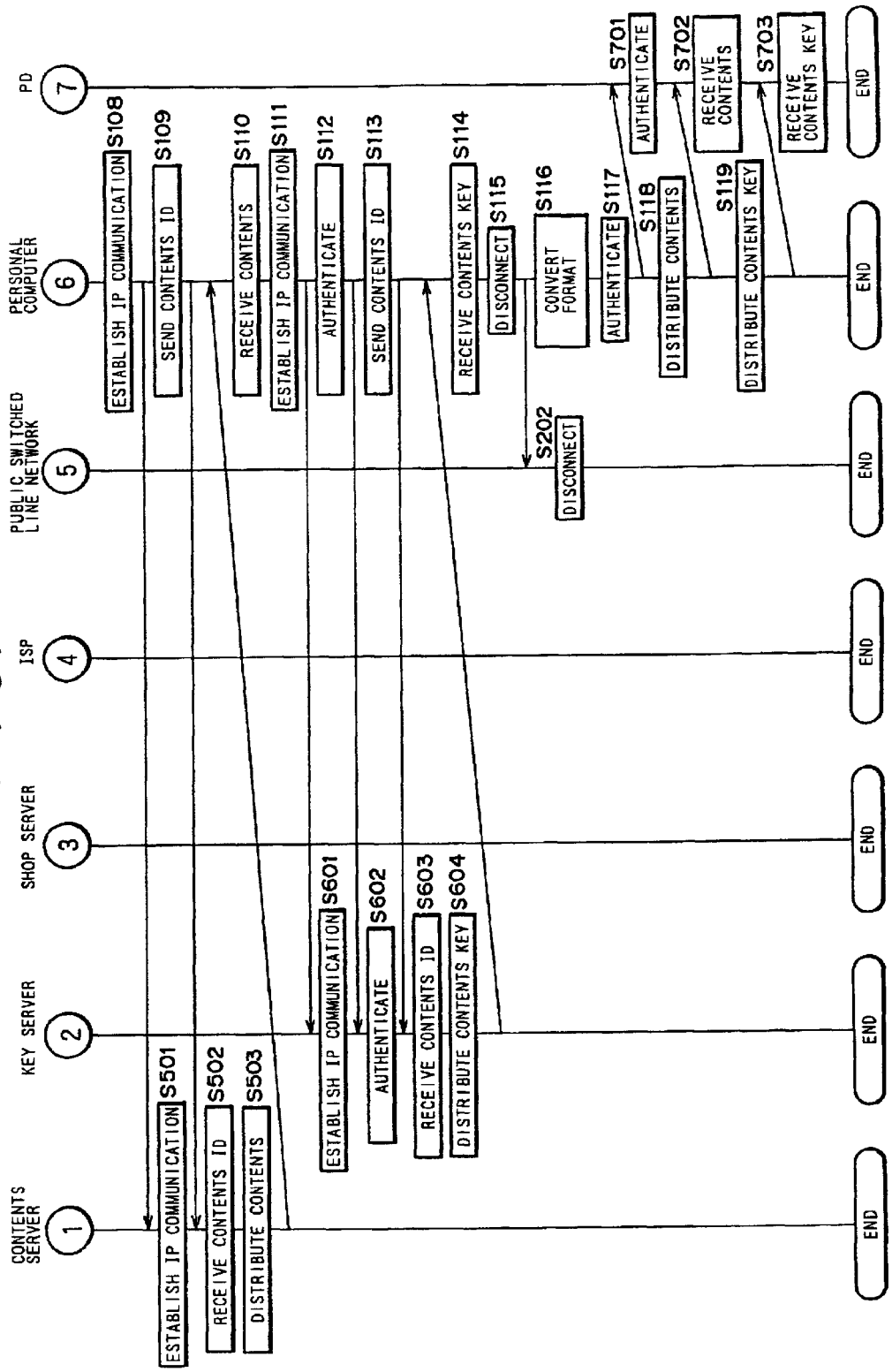
FIG. 4 is a flowchart describing conventional processing in which personal computer downloads contents from the server and checks out the downloaded contents to portable device.
Figure 5:
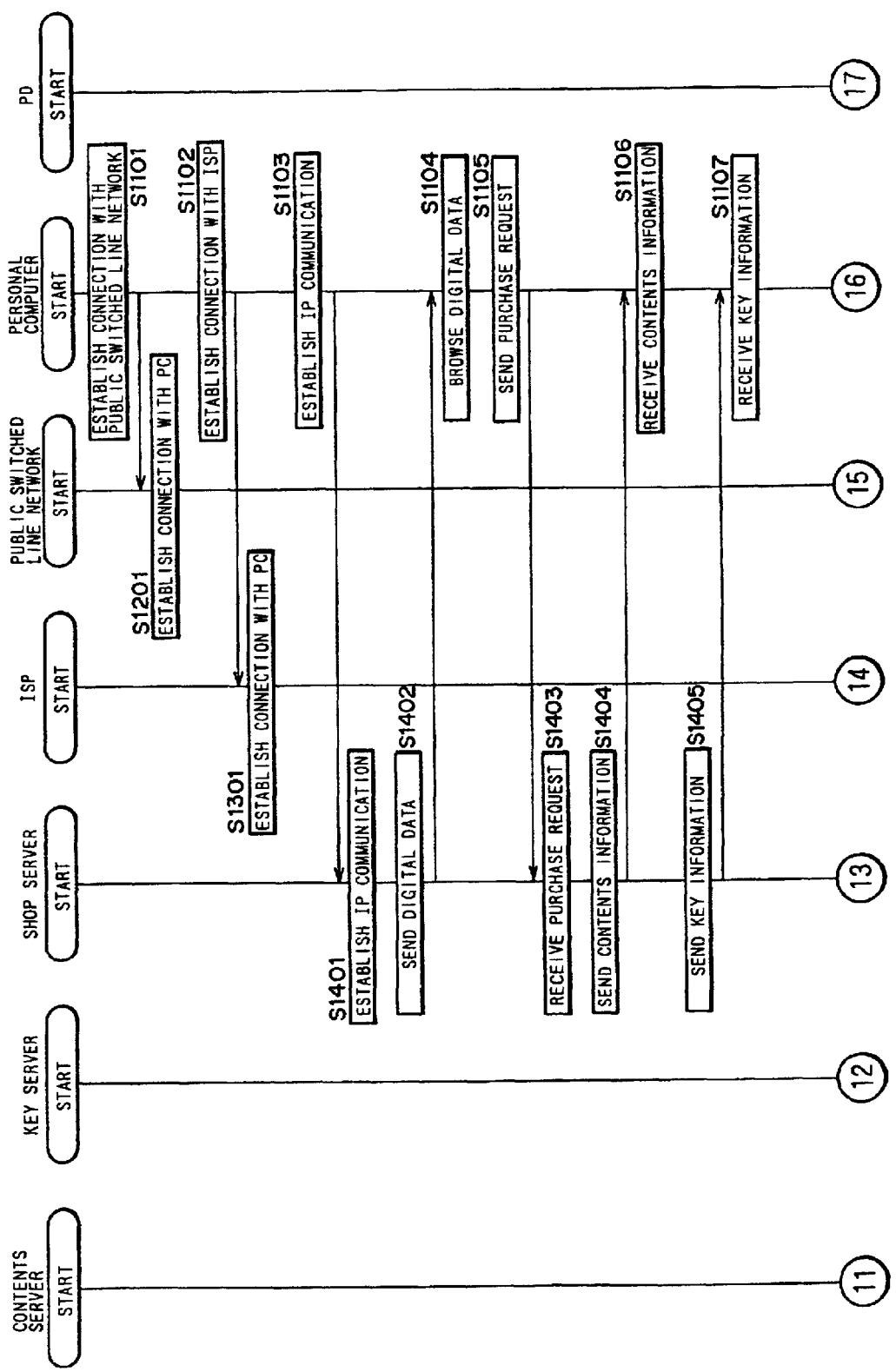
FIG. 5 is a flowchart describing conventional processing in which personal computer downloads contents from server and checks out the downloaded contents to portable device.
Figure 6:
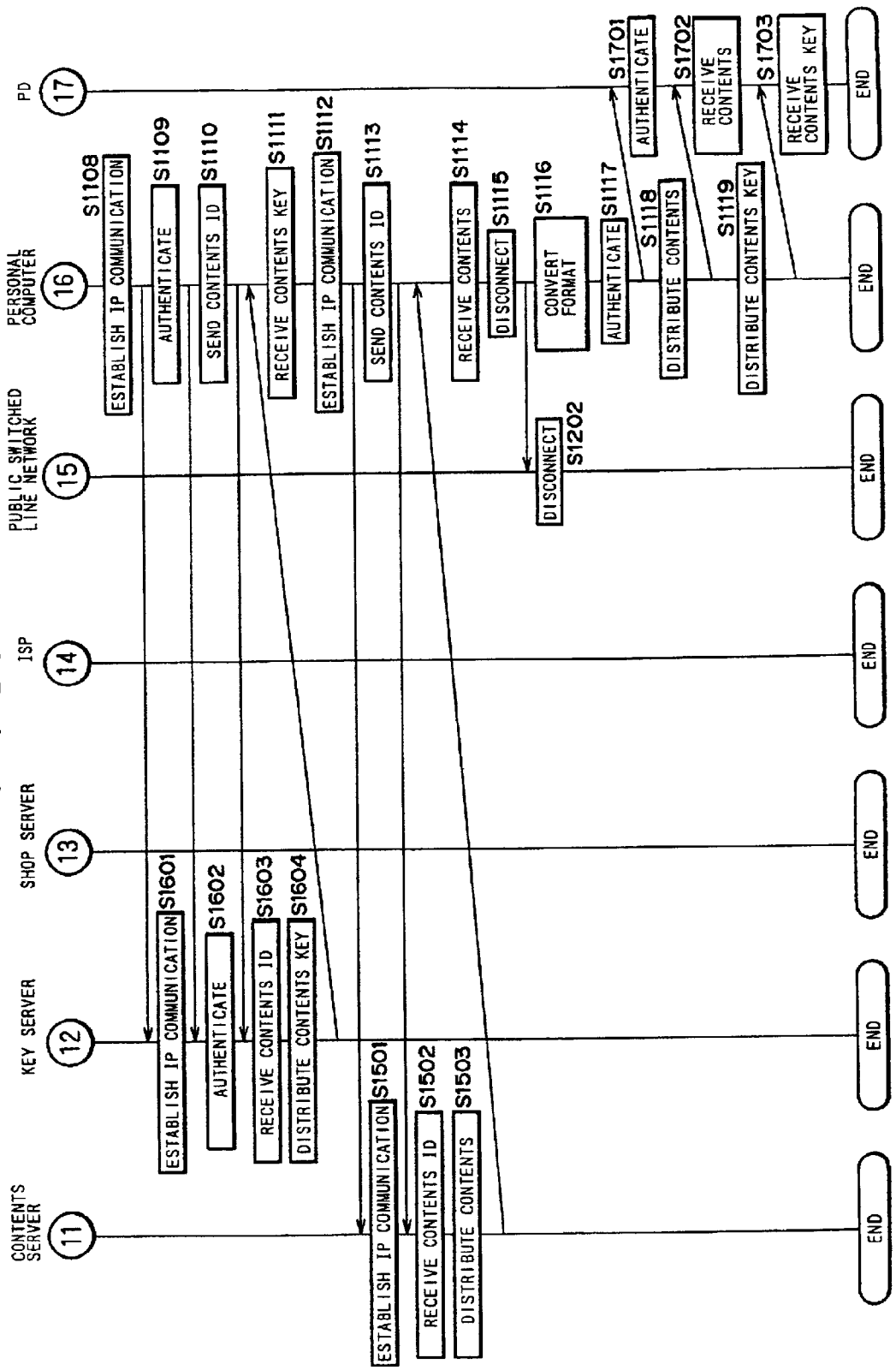
FIG. 6 is a flowchart describing conventional processing in which personal computer downloads contents from server and checks out the downloaded contents to portable device.
Figure 10:
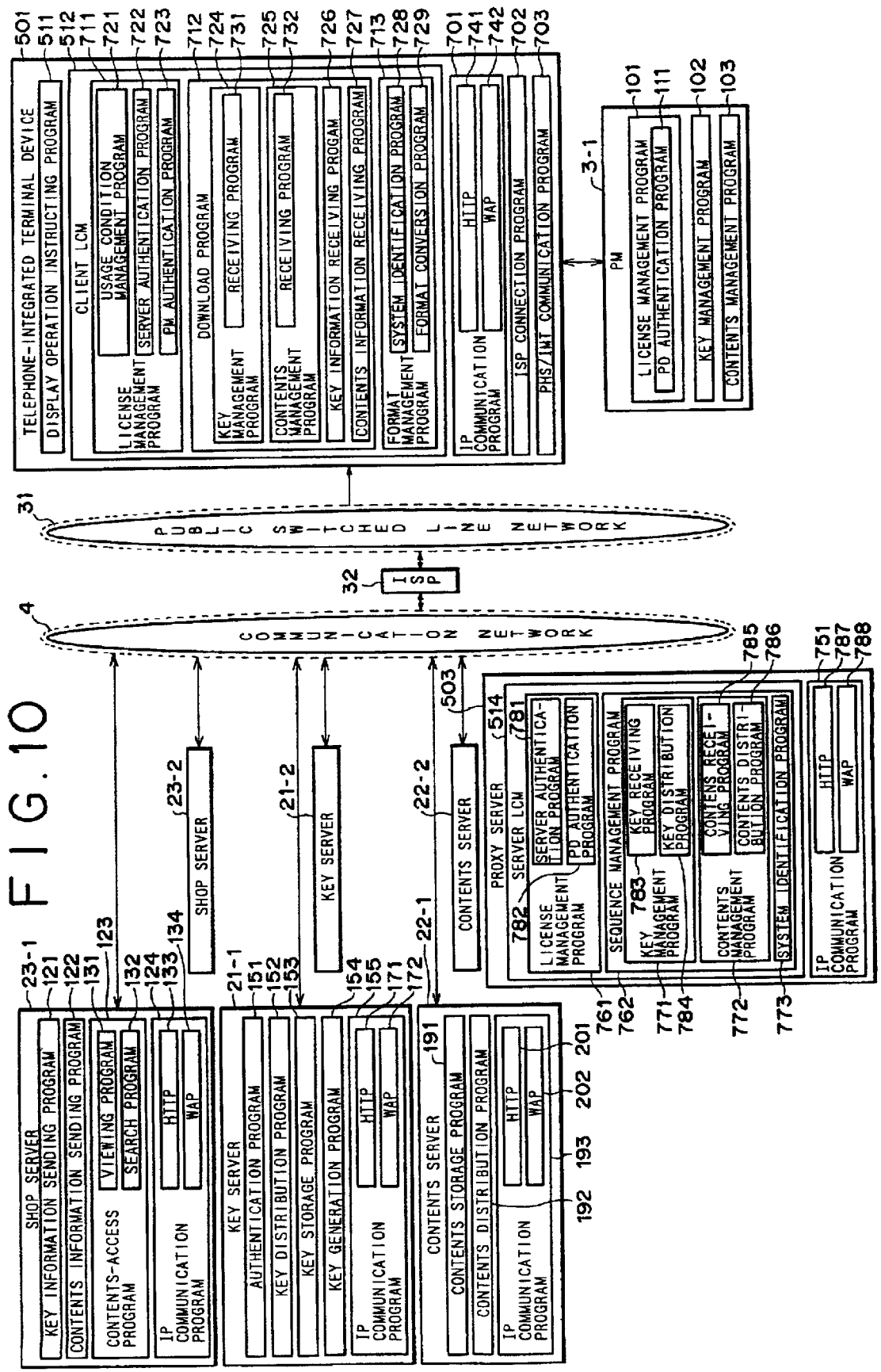
FIG. 10 is a schematic diagram illustrating a functional configuration of the digital data transmission system associated with the present invention.

The following describes a functional configuration of the digital data transmission system associated with the present invention with reference to FIG. 10. With reference to FIG. 10, components similar to those previously described with FIG. 2 are denoted by the same reference numerals and therefore their descriptions will be skipped.

The telephone-integrated terminal device 501 executes a display operation instructing program 511, a client LCM 512, an IP communication program 701, an ISP connection program 702, and a PHS/IMT communication program 703.

The PHS/IMT communication program 703 makes communication via the public switched line network 31. The ISP connection program makes connection to the ISP 32. The IP communication program 701 includes protocols such as HTTP 741 and WAP 742 and makes communication with the key server 21-1, the contents server 22-1, the shop server 23-1, the key server 21-2, the contents server 222, the shop server 23-2, or the proxy server 503 via the communication network 4.

The client LCM 512 is composed of a license management program 711, a download program 712, and a format management program 713.

The license management program 711 manages the use of contents on the basis of contents usage conditions and is composed of a usage condition management program 721, a server authentication program 722, and a PM authentication program 723.

The usage condition management program 721 control the permission or prohibition of the reproduction of the contents stored in the portable medium 3-1 and makes the portable medium 3-1 update the usage condition data stored in the portable medium 3-1 as the contents stored in the portable medium 3-1 is reproduced. The server authentication program 722 authenticates the proxy server 503 via the communication network 4. The PM authentication program 723 authenticates the portable medium 3-1 when the portable medium 3-1 is loaded in the telephone-integrated terminal device 501.

The download program 712 is composed of a key management program 724, a contents management program 725, a key information receiving program 726, and a contents information receiving program 727.

The key management program 724 receives a contents key from the proxy server 503 and manages the contents key by storing it into the portable medium 3-1 in association with the corresponding contents. The key management program 724 includes a receiving program 731 for receiving contents keys from the proxy server 503.

The contents management program 725 receives contents (encrypted) and its usage conditions from the proxy server 503 and stores the received contents and its usage conditions into the portable medium 3-1. The receiving program 732 of the contents management program 725 receives contents and its usage conditions from the proxy server 503.

The key information receiving program 726 receives the URL identifying the key server 21-1 or the key server 21-2 for supplying the contents key corresponding to the contents from the shop server 23-1 or 23-2. The contents information receiving program 727 receives the URL for identifying the contents server 22-1 or 22-2 for supplying a desired piece of contents and the contents ID for identifying it from the shop server 23-1 or 23-2.

The format management program 713 converts the encoding scheme and encryption scheme of the contents downloaded from the contents server 22-1 or 22-2 into respective predetermined schemes. The format management program 713 is composed of a system identification program 728 and a format conversion program 729.

The system identification program 728 identifies whether a particular piece of contents has been downloaded from the server 5-1 or 5-2. The format conversion program 729 converts the encoding scheme and encryption scheme of contents.

The following describes a configuration of the proxy server 503. The proxy server 503 executes the server LCM 514 and an IP communication program 751.

The server LCM 514 includes a license management program 761 and a sequence management program 762.

The license management program 761 includes a server authentication program 781 for authenticating the key server 21-1 or 21-2 and a PD authentication program 782 for authenticating the telephone-integrated terminal device 501.

The sequence management program 762 includes a key management program 771, a contents management program 772, and a system identification program 773.

The key management program 771 includes a key receiving program 783 for receiving contents keys from the key server 21-1 or 21-2 via the communication network 4 and a key distribution program 784 for distributing the received contents keys to the telephone-integrated terminal device 501 via the communication network 4.

The contents management program 772 includes contents receiving program 785 for receiving contents from the contents server 22-1 or 22-2 via the communication network 4 and a contents distribution program 786 for distributing the received contents to the telephone-integrated terminal device 501 via the communication network 4.

The system identification program 773 identifies, on the basis of the contents ID supplied from the telephone-integrated terminal device 501, whether a particular piece of contents has been downloaded from the server 5-1 or 5-2.

The IP communication program 751 includes protocols HTTP 787 and WAP 788 and makes communication with the server 5-1 or 5-2 or the telephone-integrated terminal device 501 via the communication network 4.

Figure 11:
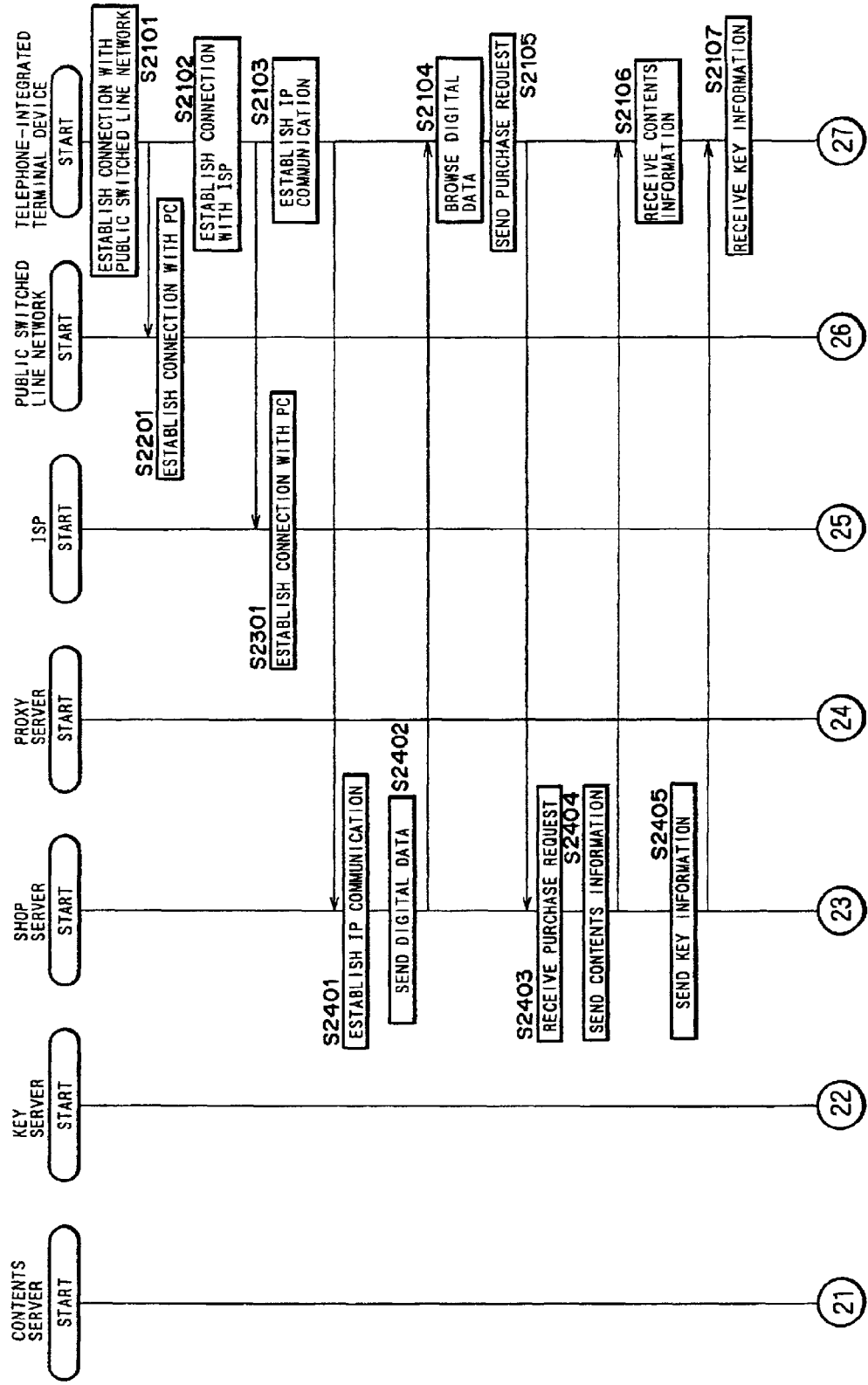
FIG. 11 is a flowchart describing processing in which telephone-integrated terminal device downloads contents from server.
Figure 12:
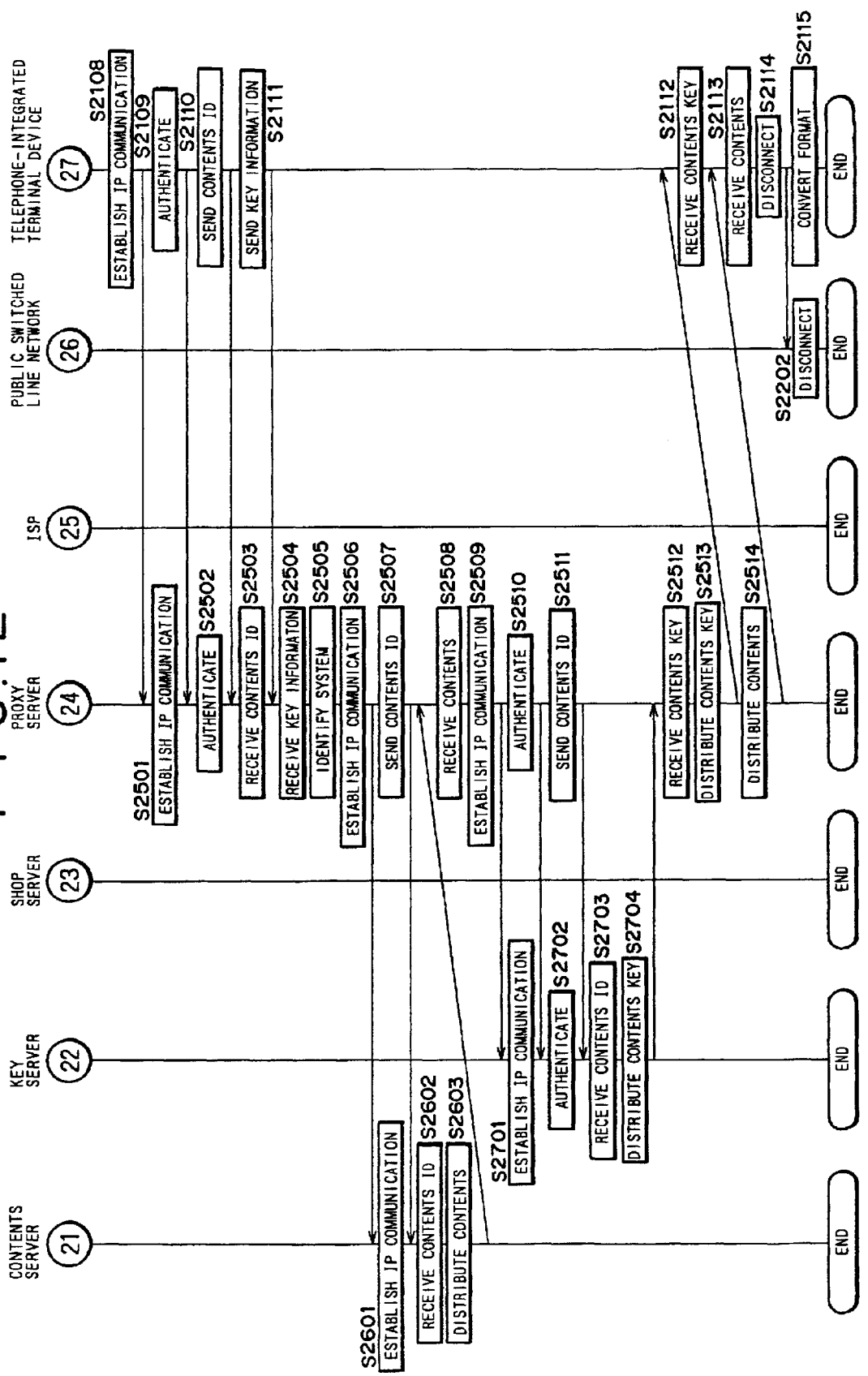
FIG. 12 is a flowchart describing processing in which telephone-integrated terminal device downloads contents from server.

The following describes a process in which the telephone-integrated terminal device 501 downloads contents from the server 5-1 with reference to the flowcharts shown in FIGS. 11 and 12. In step S2101, the PHS/IMT communication program 703 of the telephone-integrated terminal device 501 establishes communication with the public switched line network 31. In step S2201, the ground station for example, not shown, of the public switched line network 31 establishes a connection with the telephone-integrated terminal device 501.

In step S2102, the ISP connection program 702 of the telephone-integrated terminal device 501 establishes a connection with the ISP 32 via the connection between the telephone-integrated terminal device 501 and the public switched line network 31. In step S2301, the ISP 32 establishes connection with the telephone-integrated terminal device 501 via the connection between the telephone-integrated terminal device 501 and the public switched line network 31.

The subsequent processes between the telephone-integrated terminal device 501 and the key server 21-1, the contents server 22-1, the shop server 23-1 or the proxy server 503 are executed via the connection between the telephone-integrated terminal device 501 and the ISP 32.

In step S2103, the IP communication program 701 of the telephone-integrated terminal device 501 establishes IP communication with the shop server 23-1. In step S2401, the IP communication program 124 of the shop server 23-1 establishes IP communication with the shop server 23-1.

In step S2402, the contents-access program 123 of the shop server 23-1 sends digital data for viewing (or for contents selection) to the telephone-integrated terminal device 501 via the communication network 4. In step S2104, a browser program, not shown, of the telephone-integrated terminal device 501 displays the text or image corresponding to the received digital data onto the display block 606 for viewing by the user. The browser program of the telephone-integrated terminal device 501 also makes the audio reproduction block 607 reproduce the contents in a streaming reproduction manner for the test-listening by the user or the contents-access program 123 of the shop server 23-1 search for a desired piece of contents on the basis of a keyword inputted by the user, displaying the results on the display block 606.

The processes of steps S2402 and S2104 are repeated for a request by the user of the telephone-integrated terminal device 501, until the user determines the contents to be purchased for example.

In step S2105, the browser program of the telephone-integrated terminal device 501 sends a purchase request to the shop server 23-1 via the communication network 4. In step S2403, the contents-access program 123 of the shop server 23-1 receives the purchase request sent from the telephone-integrated terminal device 501.

In step S2404, in response to the purchase order received in step S2403, a contents information sending program 122 of the shop server 23-1 sends, to the telephone-integrated terminal device 501 via the communication network 4, the contents information including the URL of the contents server 22-1 for distributing the contents and the contents ID for identifying the contents. In step S2106, the contents information receiving program 727 of the telephone-integrated terminal device 501 receives the contents information from the shop server 23-1.

In step S2405, the key information sending program of the shop server 23-1 sends, to the telephone-integrated terminal device 501 via the communication network 4, the key information such as the URL of the key server 21-1 that distributes the contents key of the contents specified in the purchase request received in step S2403. In step S2107, the key information receiving program 726 of the telephone-integrated terminal device 501 receives the key information sent from the shop server 23-1.

In step S2108, the IP communication program 701 of the telephone-integrated terminal device 501 establishes IP communication with the proxy server 503 on the basis of the URL of the proxy server 503 recorded in advance. In step S2501, the IP communication program 751 of the proxy server 503 establishes IP communication with the telephone-integrated terminal device 501.

In step S2109, the server authentication program 722 of the license management program 711 of the telephone-integrated terminal device 501 authenticates the proxy server 503. In step S2502, the PD authentication program 782 of the license management program 761 of the proxy server 503 authenticates the telephone-integrated terminal device 501.

The cross-authentication processes between the telephone-integrated terminal device 501 and the proxy server 503 in step S2109 and step S2502 are executed in a challenge and response scheme. As compared with the cross-authentication between the key server 21-1 and the personal computer 1 in step S112 and step S602, the challenge response scheme needs less computational load and therefore provides quick execution with less computational performance and storage size. The telephone-integrated terminal device 501 and the proxy server 503 each generate a temporary key from the response by a same computational operation and share the generated temporary key.

If the cross-authentication in steps S2109 and S2502 fails (namely, the other party of the cross-authentication is found invalid), the process of downloading the contents by the telephone-integrated terminal device 501 ends without downloading the contents.

In step S2110, the contents management program 725 of the telephone-integrated terminal device 501 sends the contents ID to the proxy server 503. In step S2503, the proxy server 503 receives the contents ID supplied from the telephone-integrated terminal device 501. In step S2111, the key management program 724 of the telephone-integrated terminal device 501 sends the key information received in step S2107 to the proxy server 503. In step S2504, the proxy server 503 receives the key information supplied from the telephone-integrated terminal device 501.

In step S2505, on the basis of the contents ID received in step S2503, a system identification program 773 of the proxy server 503 identifies that the contents and its contents key have been downloaded from the server 5-1.

It should be noted that, in step S2110, the telephone-integrated terminal device 501 may send the URL of the contents server 22-1 along with the contents ID and, in step S2503, the proxy server 503 may receive the URL of the contents server 22-1 along with the contents ID.

In step S2506, on the basis of the identification result of step S2505, the IP communication program 751 of the proxy server 503 establishes IP communication with the contents server 22-1. In step S2601, the IP communication program 193 of the contents server 22-1 establishes IP communication with the proxy server 503.

In step S2507, the contents management program 772 of the proxy server 503 sends the contents ID obtained in step S2503 to the contents server 22-1 via the communication network 4. In step S2602, the contents server 22-1 receives the contents ID supplied from the proxy server 503. In step S2603, a contents distribution program 192 of the contents server 22-1 reads the contents (encrypted) corresponding to the contents ID received in step S2602 from a contents storage program 191 and distributes the contents to the proxy server 503 via the communication network 4.

In step S2508, a receiving program 785 of the contents management program 772 of the proxy server 503 receives the contents supplied from the contents server 22-1.

In step S2509, on the basis of the identification result in step S2505, the IP communication program 751 of the proxy server 503 establishes IP communication with the key server 21-1. In step S2701, the IP communication program 155 of the key server 21-1 establishes IP communication with the proxy server 503.

In step S2510, the server authentication program 781 of the license management program 761 of the proxy server 503 authenticates the key server 21-1. In step S2702, the authentication program 151 of the key server 21-1 authenticates the proxy server 503.

For example, the key server 21-1 stores a master key KMSS in advance and the proxy server 503 stores a private key KPCC and the ID of the proxy server 503 beforehand.

In addition, the proxy server 503 stores a master key KMCC in advance and the key server 21-1 stores the ID of the key server 21-1 and a private key KPSS.

The key server 21-1 receives the ID of the proxy server 503 therefrom and applies a hash function to the received ID and the master key KMSS of the key server 211, generating a same key as the private key KPCC of the proxy server 503.

The proxy server 503 receives the ID of the key server 21-1 therefrom and applies a hash function to the received ID and the master key KMCC of the proxy server 503, generating a same key as the private key KPSS of the key server 21-1. Consequently, the common key is shared between the proxy server 503 and the key server 21-1. By use of these private keys, a temporary key is generated.

If the cross-authentication in step S2510 or S2702 fails (namely, the other party of the cross-authentication is found invalid), the download processing comes to an end.

In step S2511, the key management program 771 of the proxy server 503 sends the contents ID obtained in step S2503 to the key server 21-1. In step S2703, the key server 21-1 receives the contents ID supplied from the proxy server 503. In step S2704, the key distribution program 152 of the key server 21-1 reads the contents key stored in the key storage program 153 in association with the contents ID and sends the contents key (encrypted by the temporary key shared between the key server 21-1 and the proxy server 503) to the proxy server 503. In step S2512, the key receiving program 783 of the key management program 771 of the proxy server 503 receives the contents key sent from the key server 21-1.

In step S2513, the key distribution program 784 of the key management program 771 of the proxy server 503 decrypts the contents key received in step S2512 by the temporary key shared between the key server 21-1 and the proxy server 503 and then encrypts the contents key by the temporary key shared between the telephone-integrated terminal device 501 and the proxy server 503, sending the resultant contents key to the telephone-integrated terminal device 501 over the communication network 4. In step S2112, the receiving program 731 of the key management program 724 of the telephone-integrated terminal device 501 receives the contents key sent from the proxy server 503. The key management program 724 decrypts the received contents key by the temporary key shared between the telephone-integrated terminal device 501 and the proxy server 503 and supplies the decrypted contents key to the key management program 102 of the portable medium 3-1 to store the contents key therein.

In step S2514, the contents distribution program 786 of the contents management program 772 of the proxy server 503 sends the encrypted contents to the telephone-integrated terminal device 501 over the communication network 4. In step S2113, the receiving program 732 of the contents management program 725 of the telephone-integrated terminal device 501 receives the contents supplied from the proxy server 503.

In step S2114, the PHS/IMT communication program 703 of the telephone-integrated terminal device 501 disconnects the connection with the public switched line network 31. In step S2202, the ground station, not shown of the public switched line network 31 disconnects the connection with the telephone-integrated terminal device 501.

In step S2115, the format management program 713 of the telephone-integrated terminal device 501 converts the format of the contents received in step S2113. The contents management program 725 sends the format-converted contents to the portable medium 3-1 via the interface 609 and stores the contents in the contents management program 103, upon which the download processing comes to an end.

Figure 13:
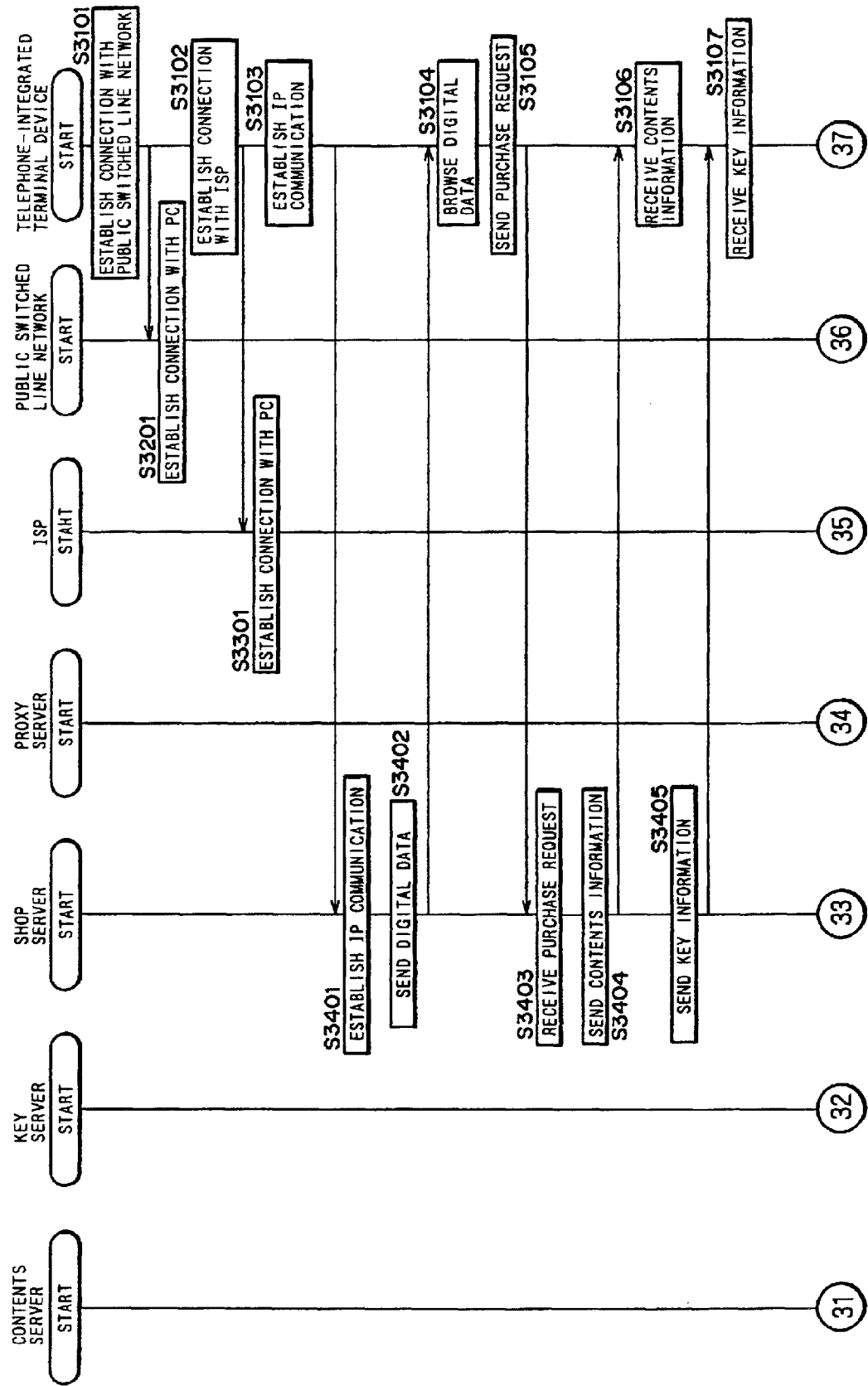
FIG. 13 is a flowchart describing processing in which telephone-integrated terminal device downloads contents from server.
Figure 14:
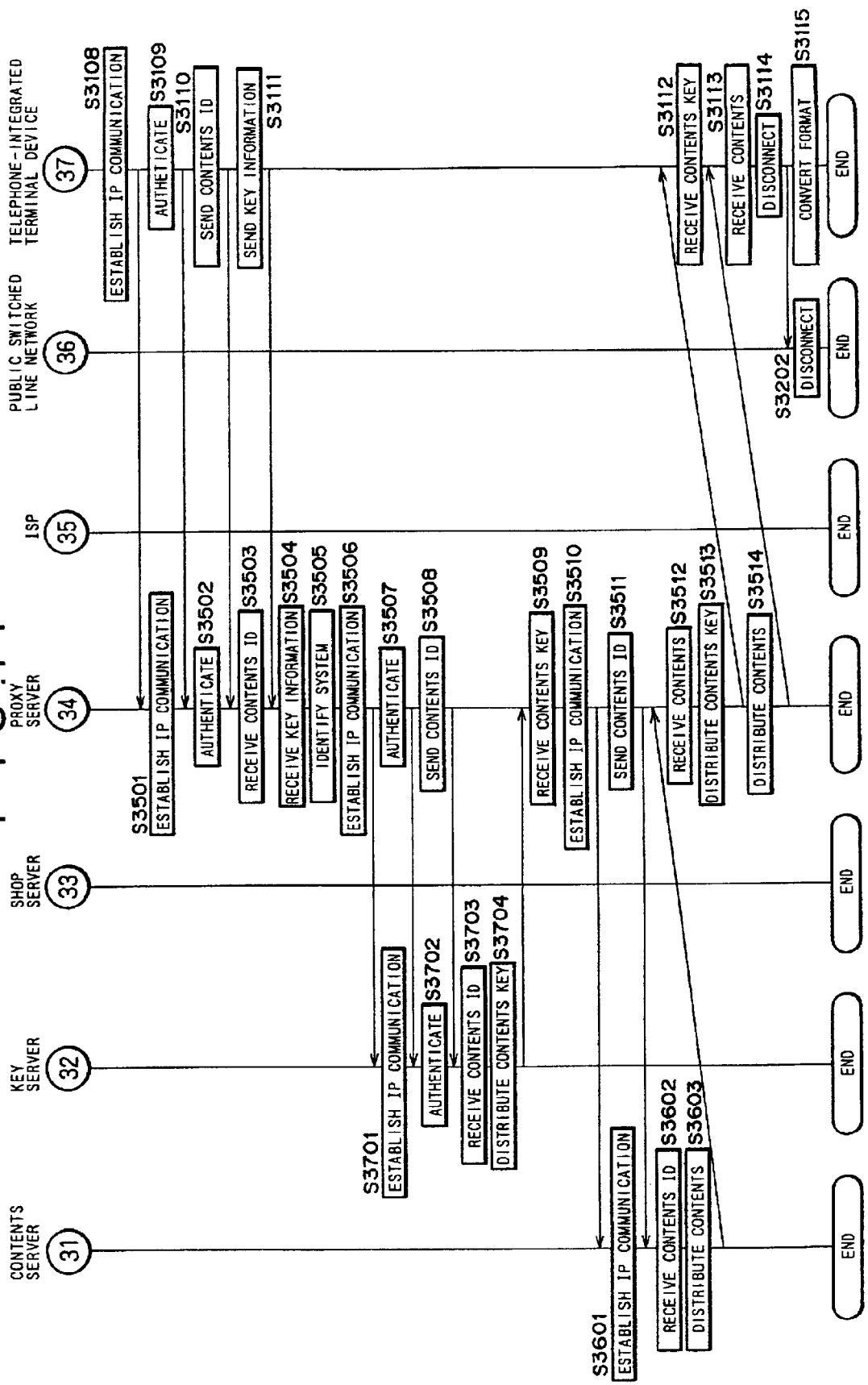
FIG. 14 is a flowchart describing processing in which telephone-integrated terminal device downloads contents from server.

The following describes a process of downloading contents by the telephone-integrated terminal device 501 from the server 5-2 with reference to the flowcharts shown in FIGS. 13 and 14. The processes of steps 3101 through S3504 are executed by the server 5-2, the IP communication program 701, the ISP connection program 702, the PHS/IMP communication program 703, and the download program 712. These processes are the same as those of steps S2101 through S2504 and therefore their descriptions will be skipped.

In step S3505, on the basis of the contents ID received in step S3503, the system identification program 773 of the proxy server 503 identifies that the contents and its contents key have been downloaded from the server 5-2.

In step S3506, on the basis of the identification result obtained in step S3505, the IP communication program 751 of the proxy server 503 establishes IP connection with the key server 21-2. In step S3701, the key server 21-2 establishes IP communication with the proxy server 503.

In step S3507, the server authentication program 781 of the proxy server 503 authenticates the key server 21-2. In step S3702, the key server 21-2 authenticates the proxy server 503.

The processes of steps S3507 and S3702 are the same as those of steps S2510 and S2702.

If the authentication in step S3507 or S3702 fails (namely, the other party of the authentication is found invalid), the download processing comes to an end.

In step S3508, the key management program 771 of the proxy server 503 sends the contents ID obtained in step S3503 to the key server 21-2. In step S3703, the key server 21-2 receives the contents ID supplied from the proxy server 503. In step S3704 the key server 21-2 reads the contents key stored in associated with the contents ID and sends the contents key (encrypted by the temporary key shared between the key server 21-2 and the proxy server 503) to the proxy server 503 over the communication network 4. In step S3509, the key receiving program 783 of the key management program 771 of the proxy server 503 receives the contents key sent from the key server 21-2.

In step S3510, on the basis of the identification result obtained in step S3505, the IP communication program 751 of the proxy server 503 establishes IP communication with the contents server 22-2. In step S3601, the contents server 22-2 establishes IP communication with the proxy server 503.

In step 3511, the contents management program 772 of the proxy server 503 sends the contents ID obtained in step S3503 to the contents server 22-2 over the communication network 4. In step S3602, the contents server 22-2 receives the contents ID sent from the proxy server 503. In step S3603, the contents server 22-2 reads the contents (encrypted) corresponding to the contents ID received in step S3602 and distributes the contents to the proxy server 503 over the communication network 4.

In step S3512, the receiving program 785 of the contents management program 772 of the proxy server 503 receives the contents sent from the contents server 22-2.

The processes of steps S3512 through S3115 are the same as those of steps S2513 through S2115 and therefore descriptions will be skipped.

Thus, by means of the proxy server 503, the telephone-integrated terminal device 501 can receive contents and its contents key in the same procedure (for example, contents is received after the reception of its contents key) regardless of whether contents and its contents key are downloaded from the server 5-1 or the server 5-2.

The procedure described above with reference to the flowcharts of FIGS. 11 through 14 can makes it shorter in time for the telephone-integrated terminal device 501 kept connected to the public switched line network 31 than the processing in which the proxy server 503 converts the encoding and encryption schemes of contents (to be described with reference to the flowcharts shown in FIGS. 16 and 17).

Figure 15:
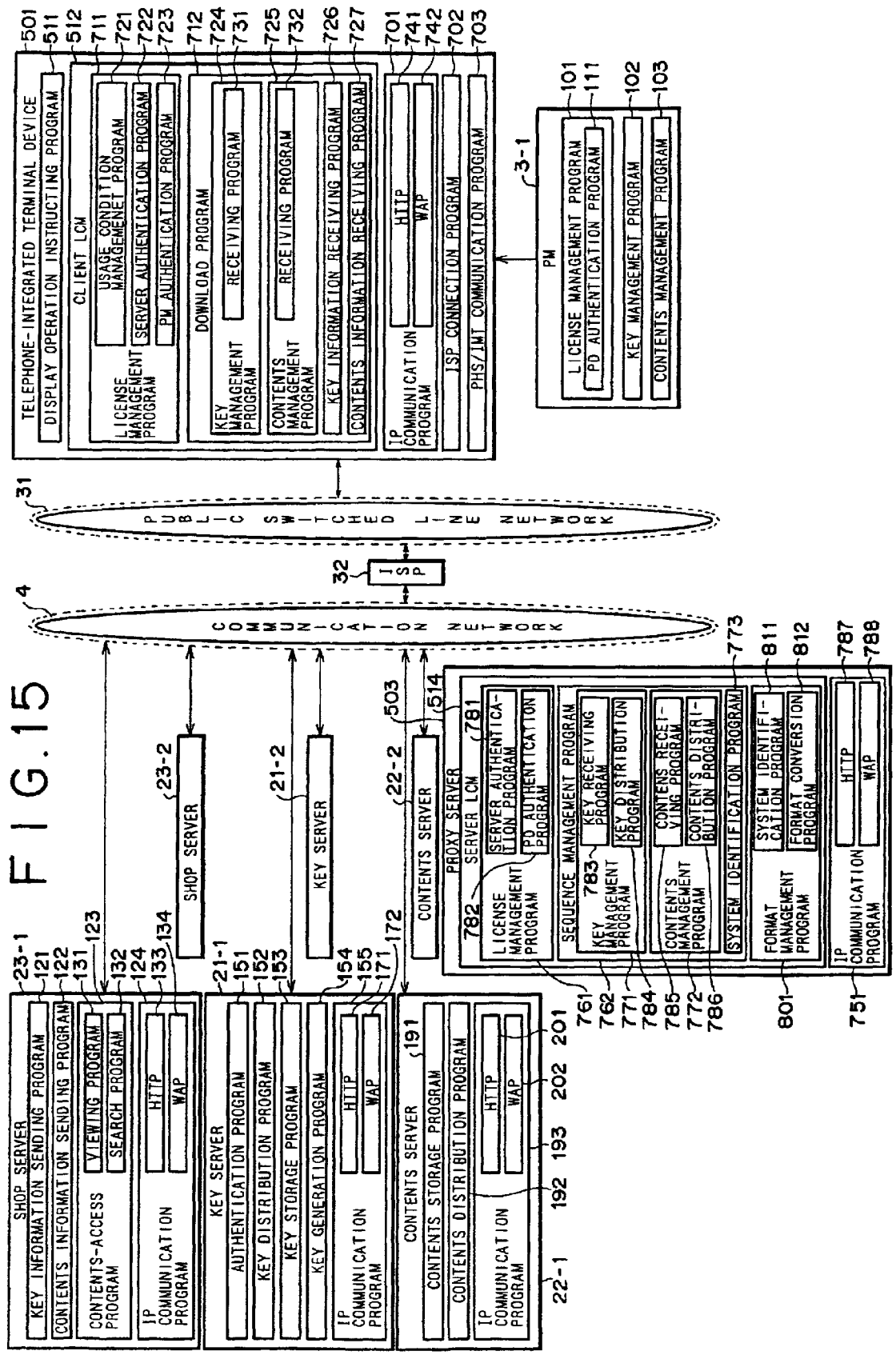
FIG. 15 is a schematic diagram illustrating another functional configuration of the digital data transmission system associated with the present invention.

The following describes another functional configuration of the digital data transmission system associated with the present invention with reference to FIG. 15. With reference to FIG. 15, components similar to those previously described with FIG. 10 are denoted by the same reference numerals and therefore their descriptions will be skipped.

A telephone-integrated terminal device 501 shown in FIG. 15 does not have the format management program 713 which is arranged in the above-mentioned embodiment.

A server LCM 514 of a proxy server 503 shown in FIG. 15 includes a format management program 801 in addition to a license management program 761 and a sequence management program 762.

The format management program 801 converts the encoding and encryption schemes of the contents downloaded from a contents server 22-1 or 22-2. The format management program 801 consists of a system identification program 811 and a format conversion program 812.

The system identification program 811 identifies whether a particular piece of contents has been downloaded from the server 5-1 or the server 5-2. The format conversion program 812 converts the encoding and encrypting schemes of downloaded contents into predetermined encoding and encryption schemes.

Figure 16:
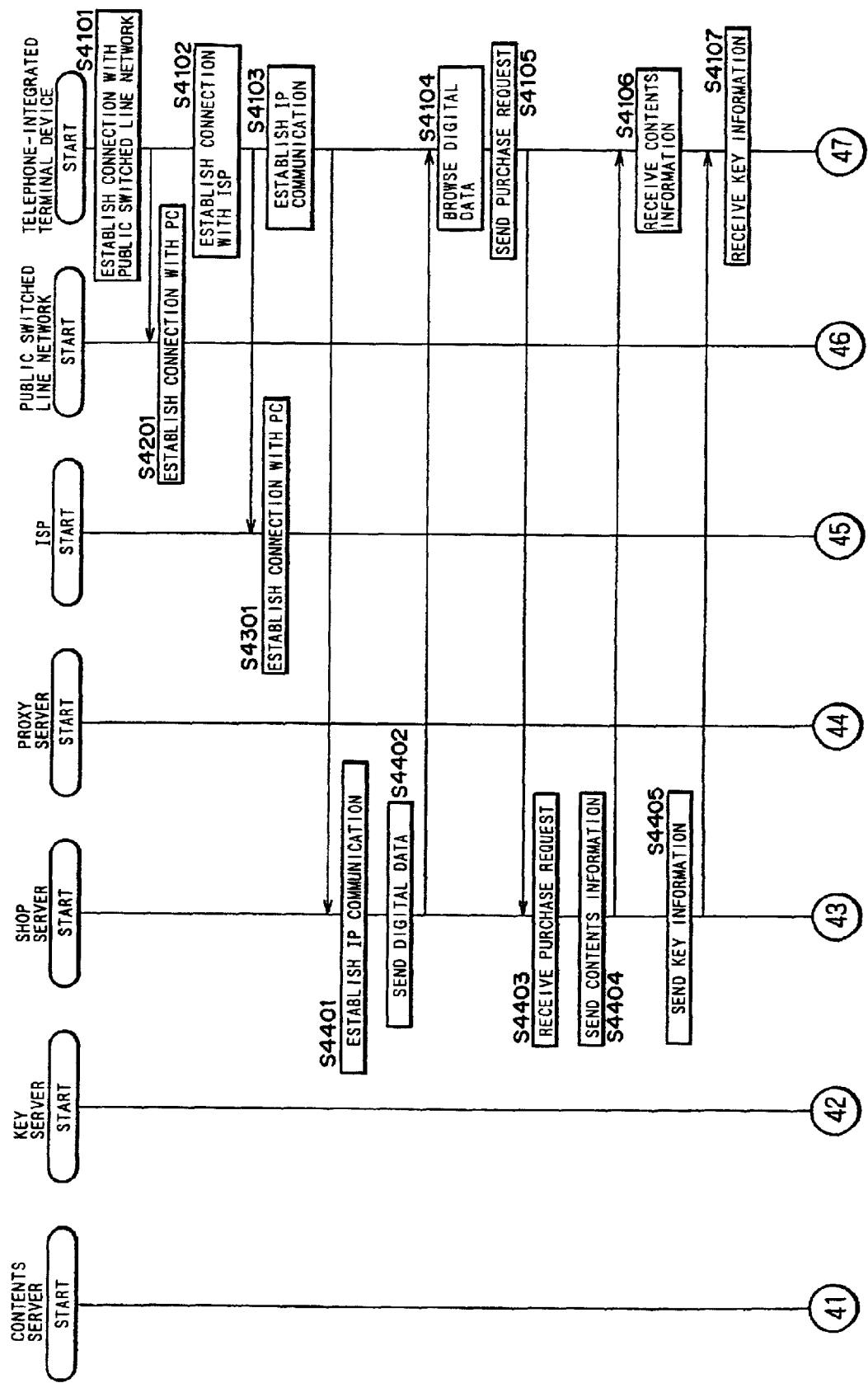
FIG. 16 is a flowchart describing processing in which telephone-integrated terminal device downloads contents from server.

The following describes a process of downloading contents by the telephone-integrated terminal device 501 and the proxy server 503 whose configuration are shown in FIG. 15 from the server 5-2, with reference to the flowcharts shown in FIGS. 16 and 17.

The processes of steps S4101 through S4512 are the same as those of steps S3101 through S3512 and therefore their descriptions will be skipped.

In step S4513, the format management program 801 of the proxy server 503 converts the format of the contents received in step S4512.

In step S4514, the key distribution program 784 of the key management program 771 of the proxy server 503 decrypts the contents key received in step S4509 by the temporary key shared between the key server 21-2 and the proxy server 503 and then encrypts by the temporary key shared between the telephone-integrated terminal device 501 and the proxy server 503, sending the resultant contents key to the telephone-integrated terminal device 501 over the communication network 4. In step S4112, the receiving program 731 of the key management program 724 of the telephone-integrated terminal device 501 receives the contents key sent from the proxy server 503. The key management program 724 decrypts the received contents key by the temporary key shared between the telephone-integrated terminal device 501 and the proxy server 503 and supplies the decrypted contents key to the key management program 102 of the portable medium 3-1, the contents key being stored in the key management program 102.

In step S4515, the contents distribution program 786 of the contents management program 772 of the proxy server 503 sends the encrypted contents to the telephone-integrated terminal device 501 via the communication network 4. In step S4113, the receiving program 732 of the contents management program 725 of the telephone-integrated terminal device 501 receives the contents sent from the proxy server 503. The contents management program 725 supplies the received contents (having converted format) to the portable medium 3-1 over the interface 609, the contents being stored in the contents management program 103.

In step S4114, the PHS/IMT communication program 703 of the telephone-integrated terminal device 501 disconnects the connection with the public switched line network 31. In step S4202, a ground station, not shown, of the public switched line network 31 for example disconnects the connection with the telephone-integrated terminal device 501, upon which the download processing comes to an end.

It should be noted that the process of receiving the contents and its contents key from the server 5-1 is executed in a procedure in which, after the proxy server 503 receives contents from the server 5-1, the contents key is received by the server 5-1.

Thus, the proxy server 503 can convert the encoding and encrypting schemes of the contents received from the server 5-1 or 5-2 and supply the resultant contents to the telephone-integrated terminal device 501. In this case, the telephone-integrated terminal device 501 need not have the programs for converting the contents encoding and encrypting schemes. Therefore, the telephone-integrated terminal device 501 can receive contents faster with less computational power and storage size than the embodiment shown in FIG. 10.

In the above, contents has been described to be music data. It will be apparent to those skilled in the art that contents may also be still picture data, moving picture data, text data, or a program.

In the above, the telephone-integrated terminal device 501 or the personal computer 502 download contents. It will be apparent to those skilled in the art that a mobile telephone, a PDA (Personal Digital Assistant), a digital video cassette recorder having communication and imaging capabilities, an electronic notepad having communication capabilities, or a portable personal computer may download contents, in addition to the telephone-integrated terminal device 501 and the personal computer 502.

In the above, the telephone-integrated terminal device 501 makes necessary communication by means of PHS or IMT. It will be apparent to those skilled in the art that the telephone-integrated terminal device 501 alternatively may make communication by means of W-CDMA (Code Division Multiple Access), satellite communication, satellite broadcasting, PSTN (Public Switched Telephone Network), xDSL (x Digital Subscriber Line), ISDN (Integrated Services Digital Network), or a private network.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from the program storage medium.

The program storage medium for storing computer-readable and executable programs may be a package medium constituted by the magnetic disk 641 or 681

(including floppy disk), the optical disk 642 or 682 (including CD-ROM (Compact Disk-Read Only Memory) and DVD (Digital Versatile Disk)), the magneto-optical disk 643 or 683 (including MD (Mini Disk)), or the semiconductor memory 644 or 684 or the ROM 602 or 652, or the HDD 661 on which the programs are stored temporarily or permanently as shown in FIG. 8 or 9. Programs are stored in the program storage medium from wired or wireless communication media such as a local area network, the Internet, and digital satellite broadcasting through the communication block 608 or 663 as required.

It should be noted that the steps describing the programs to be stored in the program storage medium are not only executed in a time-dependent manner in the order described, but also in parallel or in a discrete manner.

It should also be noted that the system as used herein denotes an entire apparatus constituted by a plurality of component units.

In the information providing apparatus recited in claim 1, the information providing method recited in claim 5, and the program storage medium recited in claim 9, a first information processing unit is authenticated; a second information processing unit or a third information processing unit is authenticated; the reception of a request to send contents and a key and data for identifying the second information processing unit or data for identifying the third information processing unit is controlled, the request and the data being supplied from the first information processing unit; if the data for identifying the second information processing unit are received, the transmission of the request to send the contents and the key to the second information processing unit in a procedure corresponding to the second information processing unit is controlled, and, if the contents and the key are received and the data for identifying the third information processing unit are received from the second information processing unit, the transmission of the request to send the contents and the key to the third information processing unit and the reception of the contents and the key from the third information processing unit in a procedure corresponding to the third information processing unit are controlled; the transmission of the contents and the key to the first information processing unit is controlled.

In the information processing apparatus recited in claim 10, the information processing method recited in claim 14, and the program storage medium recited in claim 18, a first information providing unit is authenticated; a the transmission of any one of a request to send contents and a key to the first information providing unit, data for identifying a second information providing unit for providing the contents and the key, and data for identifying a third information providing unit for providing the contents and the key is controlled; and the reception of the contents and the key supplied from the second information providing unit or the third information providing unit to the first information providing unit is controlled.

While the preferred embodiments of the present invention have been described using specific terms, such description is for illustrative purposes only, and it is to be understood that changes and variations may be made without departing from the spirit or scope of the appended claims.

What is claimed is:

1. An information providing apparatus comprising:
    a first authentication means for authenticating a first information processing unit;
    a second authentication means for authenticating a second information processing unit or a third information processing unit;
    a reception control means for controlling the reception of a request to send contents and a key and data for identifying said second information processing unit or data for identifying said third information processing unit, said request and said data being supplied from said first information processing unit;
    a communication control means for controlling, if said data for identifying said second information processing unit are received, the transmission of said request to send said contents and said key to said second information processing unit in a procedure corresponding to said second information processing unit, and, (the transmission of) said contents and said key, and if said data for identifying said third information processing unit are received from said second information processing unit, the transmission of said request to send said contents and said key to said third information processing unit and the reception of said contents and said key from said third information processing unit in a procedure corresponding to said third information processing unit; and
    a transmission control means for controlling the transmission of said contents and said key to said first information processing unit.

2. The information providing apparatus according to claim 1, further comprising:
    a conversion means for converting at least one of a encoding scheme and an encryption scheme in which said contents is encoded and encrypted into one of a predetermined encoding scheme and a predetermined encryption scheme.

3. The information providing apparatus according to claim 1, wherein said first information processing unit is a portable electronic device for reproducing said contents and said second information processing unit and said third information processing unit are servers each including a contents server and a key server and each having a different procedure in which contents and its key are supplied.

4. The information providing apparatus according to claim 1, further comprising a server licensed compliant module which is constituted as a proxy server.

5. An information providing method comprising the steps of:
    authenticating a first information processing unit;
    authenticating a second information processing unit or a third information processing unit;
    controlling the reception of a request to send contents and a key and data for identifying said second information processing unit or data for identifying said third information processing unit, said request and said data being supplied from said first information processing unit;
    controlling, if said data for identifying said second information processing unit are received, the transmission of said request to send said contents and said key to said second information processing unit in a procedure corresponding to said second information processing unit and said contents and said key, and, if said data for identifying said third information processing unit are received from said second information processing unit, the transmission of said request to send said contents and said key to said third information processing unit and the reception of said contents and said key from said third information processing unit in a procedure corresponding to said third information processing unit; and
    controlling the transmission of said contents and said key to said first information processing unit.

6. The information providing method according to claim 5, further comprising the step of:

converting at least one of a encoding scheme and an encryption scheme in which said contents is encoded and encrypted into one of a predetermined encoding scheme and a predetermined encryption scheme.

7. The information providing method according to claim 5, wherein said first information processing unit is a portable electronic device for reproducing said contents and said second information processing unit and said third information processing unit are servers each including a contents server and a key server and each having a different procedure in which contents and its key are supplied.

8. The information providing method according to claim 5, wherein said method is executed by a proxy server including a server licensed compliant module.

9. A program storage medium storing a computer-readable program comprising the steps of:

authenticating a first information processing unit;

authenticating a second information processing unit or a third information processing unit;

controlling the reception of a request to send contents and a key and data for identifying said second information processing unit or data for identifying said third information processing unit, said request and said data being supplied from said first information processing unit;

controlling, if said data for identifying said second information processing unit are received, the transmission of said request to send said contents and said key to said second information processing unit in a procedure corresponding to said second information processing unit and said contents and said key, and, if said data for identifying said third information processing unit are received from said second information processing unit, the transmission of said request to send said contents and said key to said third information processing unit and the reception of said contents and said key from said third information processing unit in a procedure corresponding to said third information processing unit; and controlling the transmission of said contents and said key to said first information processing unit.

10. An information processing apparatus comprising:

an authentication means for authenticating a first information providing unit;

a transmission control means for controlling the transmission of any one of a request to send contents and a key to said first information providing unit, data for identifying a second information providing unit for providing said contents and said key, and data for identifying a third information providing unit for providing said contents and said key; and a reception control means for controlling the reception of said contents and said key supplied from said second information providing unit or said third information providing unit to said first information providing unit.

11. The information processing apparatus according to claim 10, wherein said first information providing unit is a proxy server having a server licensed compliant module and said second information providing unit and said third information providing unit are servers each including a contents server and a key server and each having a different procedure in which contents and its key are supplied.

12. The information processing apparatus according to claim 10, wherein said information processing apparatus is a portable electronic device for reproducing said contents.

13. The information processing apparatus according to claim 10, having a download program capable of downloading contents from any of said second information providing unit and said third information providing unit.

14. An information processing method comprising the steps of:

authenticating a first information providing unit;

controlling the transmission of any one of a request to send contents and a key to said first information providing unit, data for identifying a second information providing unit for providing said contents and said key, and data for identifying a third information providing unit for providing said contents and said key; and controlling the reception of said contents and said key supplied from said second information providing unit or said third information providing unit to said first information providing unit.

15. The information processing method according to claim 14, wherein said first information providing unit is a proxy server having a server licensed compliant module and said second information providing unit and said third information providing unit are servers each having a contents server and a key server and each having a different procedure in which contents and its key are supplied.

16. The information processing method according to claim 14, wherein said method is executed by a portable electronic device for reproducing said contents.

17. The information processing method according to claim 14, wherein each of said reception controlling steps is executed by a download program capable of downloading contents from any of said second information providing unit and said third information providing unit.

18. A program storage medium storing a computer-readable program comprising:

authenticating a first information providing unit;

controlling the transmission of any one of a request to send contents and a key to said first information providing unit, data for identifying a second information providing unit for providing said contents and said key, and data for identifying a third information providing unit for providing said contents and said key; and controlling the reception of said contents and said key supplied from said second information providing unit or said third information providing unit to said first information providing unit.

* * * * *